US 11,094,070 B2

(12) United States Patent
Yang et al.

(10) Patent No.: US 11,094,070 B2
(45) Date of Patent: Aug. 17, 2021

(54) VISUAL MULTI-OBJECT TRACKING BASED ON MULTI-BERNOULLI FILTER WITH YOLOV3 DETECTION

(71) Applicant: Jiangnan University, Wuxi (CN)

(72) Inventors: Jinlong Yang, Wuxi (CN); Xiaoxue Cheng, Wuxi (CN); Guangnan Zhang, Wuxi (CN); Jianjun Liu, Wuxi (CN); Yuan Zhang, Wuxi (CN); Hongwei Ge, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 16/869,645

(22) Filed: May 8, 2020

(65) Prior Publication Data

US 2020/0265591 A1     Aug. 20, 2020

Related U.S. Application Data

(63) Continuation of application No. PCT/CN2019/094662, filed on Jul. 4, 2019.

(30) Foreign Application Priority Data

Apr. 23, 2019   (CN) .......................... 201910328735X

(51) Int. Cl.
*G06K 9/00*     (2006.01)
*G06T 7/246*    (2017.01)
*G06T 7/174*    (2017.01)

(52) U.S. Cl.
CPC .............. *G06T 7/246* (2017.01); *G06T 7/174* (2017.01); *G06T 2207/10016* (2013.01); *G06T 2207/20081* (2013.01)

(58) Field of Classification Search
CPC ..................... G06T 7/246; G06T 7/174; G06T 2207/20081; G06T 2207/10016;
(Continued)

(56) References Cited

U.S. PATENT DOCUMENTS

2017/0255832 A1*   9/2017  Jones ................... G06N 3/0454
2017/0286774 A1*  10/2017  Gaidon .............. G06K 9/00805
(Continued)

FOREIGN PATENT DOCUMENTS

CN       103176164 A       6/2013
CN       105354860 A       2/2016
(Continued)

OTHER PUBLICATIONS

Liang et al, (Online Visual Multi-object Tracking Based on Fuzzy Logic, 2016 IEEE, pp. 1001-1005 (Year: 2016).*
(Continued)

*Primary Examiner* — Amara Abdi
(74) *Attorney, Agent, or Firm* — IPro, PLLC; Na Xu

(57) ABSTRACT

The disclosure discloses a visual multi-object tracking based on multi-Bernoulli filter with YOLOv3 detection, belonging to the fields of machine vision and intelligent information processing. The disclosure introduces a YOLOv3 detection technology under a multiple Bernoulli filtering framework. Objects are described by using anti-interference convolution features, and detection results and tracking results are interactively fused to realize accurate estimation of video multi-object states with unknown and time-varying number. In a tracking process, matched detection boxes are combined with object tracks and object templates to determine new objects and re-recognize occluded objects in real time. Meanwhile, under the consideration of identity information of detected objects and estimated objects, identity recognition and track tracking of the objects are realized, so that the tracking accuracy of the occluded objects can be effectively improved, and track fragments are reduced. Experiments show that the disclosure has good tracking effect and robustness, and can widely meet the actual design requirements of (Continued)

systems such as intelligent video monitoring, human-machine interaction and intelligent traffic control.

11 Claims, 11 Drawing Sheets

(58) Field of Classification Search
CPC . G06T 2207/20021; G06T 2207/20072; G06T 7/277; G06T 7/223
See application file for complete search history.

(56) References Cited

U.S. PATENT DOCUMENTS

| | | | |
|---|---|---|---|
| 2018/0268563 A1* | 9/2018 | Chen | G06T 7/194 |
| 2019/0035088 A1* | 1/2019 | LeGrand | G06T 7/277 |
| 2019/0213420 A1* | 7/2019 | Karyodisa | G06K 9/00288 |
| 2020/0050870 A1* | 2/2020 | Zangenehpour | G06K 9/00785 |

FOREIGN PATENT DOCUMENTS

| | | | | |
|---|---|---|---|---|
| CN | 106408594 | * | 2/2017 | G06T 7/277 |
| CN | 106408594 A | | 2/2017 | |
| CN | 106910205 | * | 6/2017 | G06T 7/277 |
| CN | 106910205 A | | 6/2017 | |
| CN | 109002783 A | | 12/2018 | |
| CN | 109117794 | * | 1/2019 | G06K 9/00342 |
| CN | 109508444 | * | 3/2019 | G06F 17/18 |
| CN | 109508444 A | | 3/2019 | |
| CN | 109657577 | * | 4/2019 | G06K 9/00718 |

OTHER PUBLICATIONS

Hongquan, (A Pedestrian detection method based on YOLOv3 model and Image enhanced by Retinex, 2018 IEEE (Year: 2018).*
PCT/CN2019/094662 ISR ISA210 dated Feb. 7, 2020.

* cited by examiner

VISUAL MULTI-OBJECT TRACKING BASED ON MULTI-BERNOULLI FILTER WITH YOLOV3 DETECTION

TECHNICAL FIELD

The disclosure relates to a visual multi-object tracking based on multi-Bernoulli filter with YOLOv3 detection, and belongs to the fields of machine vision and intelligent information processing.

BACKGROUND

In the field of video multi-object tracking application in complex environments, in addition to the problems such as illumination variations, object deformation, and object occlusion, there are also complexities such as unknown number of objects, uncertain newborn objects, object crossing or adjoining motion, object disappearance, and noise interference.

These are always difficulties in researches and challenging problems in the field of multi-object tracking.

For the problem of video multi-object tracking, data association based on object detection and tracking methods are mainly used at the early stage. Firstly, an object detector is used to perform multi-object detection on a video sequence, and then the video multi-object tracking is completed by virtue of data association and other technologies.

Typical data association includes: multiple hypothesis tracking, joint probability data association, graph decomposition, dynamic programming, etc. Although these methods have achieved certain effects in video multi-object tracking, the operational efficiency of an algorithm is reduced to a certain extent due to complex data association operation. In addition, there are problems of inaccurate estimation of the number and states of objects for multi-object tracking with unknown and varying number.

In recent years, the random finite set (RFS) theory has achieved certain advantages in the multi-object tracking with unknown and varying number. Object states and observations are respectively subjected to random set modeling to avoid complex data association operation. Since Professor Mahler has proposed probability hypothesis density (PHD) and multiple Bernoulli (MeMBer) filters, the RFS theory has been widely used in the field of object tracking. In general, multi-object tracking algorithms based on the RFS theory mainly include two categories: a multi-object tracking algorithm based on PHD/cardinalized probability hypothesis density (CPHD) and a multi-object tracking algorithm based on MeMBer/CBMeMBer. Typical closed solutions include: particle filter PHD/CPHD, Gaussian hybrid PHD/CPHD, particle filter CBMeMBer, and Gaussian hybrid CBMeMBer. In particular, a particle filter multiple Bernoulli (PFMB) technology, which uses the multi-object Bayesian estimation theory to recursively approximate the posterior probability density of a multi-object state set, can improve the tracking accuracy of multiple objects with a varying number. However, it is difficult for the PFMB method to detect newborn objects, and when mutual occlusion and interference occur among the multiple objects, the tracking accuracy is reduced, and even the problem that objects are not estimated appears.

SUMMARY

In order to solve the problems that the tracking accuracy is reduced and even objects are not estimated because an existing object tracking method cannot detect newborn objects and mutual occlusion and interference occur among multiple objects at the present, the disclosure provides a visual multi-object tracking based on multi-Bernoulli filter with YOLOv3 detection. In the detection and tracking process, the method includes: detecting kth and (k+1)th frames of video sequences by using a YOLOv3 technique;

recording the number of detection boxes in the kth frame of video sequence as n, and recording a detection box state set as $\tilde{S}_k = \{\tilde{s}_k^{\tilde{I}_k^i}\}_{i=1}^n$;

recording the number of detection boxes in the (k+1)th frame of video sequence as m, and recording a detection box state set as $\tilde{S}_{k+1} = \{\tilde{s}_{k+1}^{\tilde{I}_{k+1}^i}\}_{i=1}^m$;

where $\tilde{s}_k^{\tilde{I}_k^i} = [\tilde{x}_k^{\tilde{I}_k^i}, \tilde{y}_k^{\tilde{I}_k^i}, \tilde{w}_k^{\tilde{I}_k^i}, \tilde{h}_k^{\tilde{I}_k^i}, \tilde{I}_k^i]$ represents a state vector of an ith detection box in the kth frame of video sequence, and the parameters $\tilde{x}_k^{\tilde{I}_k^i}, \tilde{y}_k^{\tilde{I}_k^i}, \tilde{w}_k^{\tilde{I}_k^i}, \tilde{h}_k^{\tilde{I}_k^i}, \tilde{I}_k^i$ respectively represent an x-coordinate and a ycoordinate of the upper left corner of the ith detection box in the kth frame of video sequence, and the width, the height and the identity of the detection box;

matching the detection boxes in the kth and (k+1)th frames of video sequences:

for an initial frame of a video, k=0, adding the matched detection boxes in the initial frame into an object template set and an object track set as initial newborn objects;

for a middle frame of the video, k>0, realizing newborn object determination, missing object re-recognition and optimal tracking of survival objects by using the detection box, object track information and object template information, where the optimal tracking of survival objects is that a tracking process of a corresponding object is optimized under a multiple Bernoulli filtering architecture by using information of the detection box with the confidence score greater than a set confidence score threshold value $T_B$ in the current frame.

Optionally, for the initial frame of the video, k=0, adding the matched detection boxes into the object template set and the object track set as the newborn objects includes:

representing the detection boxes in the kth and (k+1)th frames of video sequences by using anti-interference convolution features, and respectively recording the detection boxes as $\tilde{F}_k = \{\tilde{f}_k^1, \tilde{f}_k^2, \ldots \tilde{f}_k^n\}$ and $\tilde{F}_{k+1} = \{\tilde{f}_{k+1}^1, \tilde{f}_{k+1}^2, \ldots \tilde{f}_{k+1}^m\}$, where $\tilde{f}_k^i$ represents a convolution feature vector of the ith detection box in the kth frame of video sequence;

calculating a similarity matrix $\Lambda$ corresponding to convolution features of the detection box, that is:

$$\Lambda = \begin{bmatrix} e_{11} & \cdots & e_{1m} \\ e_{21} & \cdots & e_{2m} \\ \vdots & \ddots & \vdots \\ e_{n1} & \cdots & e_{nm} \end{bmatrix}$$

where $e_{ij} = e^{-\|\tilde{f}_k^i - \tilde{f}_{k+1}^j\|_2^1}$ represents the similarity between the ith detection box in the kth frame of video sequence and the jth detection box in the (k+1)th frame of video sequence; and selecting two detection boxes with maximum similarity values and greater than a similarity threshold value $T_I$ from each row of the similarity matrix $\Lambda$ as matching results, and adding a finally matched detection box pair into the object template set and the object track set as the initial newborn objects.

Optionally, matching the detection boxes in the two initial frame of video sequences, determining newborn objects, and adding the finally matched detection box pair into the object template set as the initial newborn objects includes:

if a same object does not have an extremely large displacement change in two adjacent frames of video sequences, on the basis of similarity matching, adding the intersection over union IOU of an object box as a limit: if the intersection over union IOU of the two detection boxes is greater than an intersection over union threshold value $T_u$, determining that the two detection boxes are matched;

selecting two detection boxes with maximum similarity values and greater than the similarity threshold value $T_l$ and the intersection over union IOU greater than the intersection over union threshold value $T_u$ from each row of the similarity matrix $\Lambda$ as a matched result, allocating an identity $\{l^i\}_{i=1}^{M_k}$ to the finally matched detection box pair as the initial newborn object, adding the matched detection box pair into the object track set $S_k = \{s_k^{i}\}_{i=1}^{M_k}$, where $s_k^{i} = [x_k^{i}, y_k^{i}, w_k^{i}, h_k^{i}, l^i]$ is an object state vector, various components respectively represent an x-coordinate and a y-coordinate of the upper left corner of the ith object box and the width, the height and the identity of the object box, and $M_k$ is the number of objects in the kth frame; adding an object identity, i.e., $\tilde{l}_k^i = l^i$, $\tilde{l}_{k+1}^j = l^i$, corresponding to the initial newborn object to the matched detection box pair, and building a newborn object template.

Optionally, for the middle frame of the video, k>0, realizing the newborn object determination, the missing object re-recognition and the optimal tracking of survival objects by using the detection box, the object track information and the object template information includes:

matching adjacent detection boxes, determining determination conditions of newborn objects and re-recognized objects, and determining whether an object is a newborn object, a re-recognized object or a survival object according to the detection boxes of adjacent frames, the object template set and a survival object track set.

Optionally, matching the adjacent detection boxes includes:

calculating a similarity matrix $\Lambda$ between the detection boxes in the kth and (k+1)th frames of video sequences, selecting two detection boxes with maximum similarity values and greater than the similarity threshold value $T_l$ from each row of the similarity matrix $\Lambda$, determining that the two detection boxes are matched if the intersection over union IOU of the two detection boxes is greater than the intersection over union threshold value $T_u$, and assigning the identity of the matched object in the (k+1)th frame if the ith detection box in the kth frame is matched with the jth detection box in the (k+1)th frame, that is:

$$\tilde{j}_{k+1}^j = \tilde{l}_k^i,$$

where $\tilde{l}_k^i$ represents the identity of the ith detection box in the kth frame of video sequence, and if $\tilde{l}_k^i$ is empty, indicating that an object included in the detection box is not detected in a (k−1)th frame of video sequence.

Optionally, determining whether an object is a newborn object, a re-recognized object or a survival object according to the detection boxes of adjacent frames, the object template set and the survival object track set includes:

(1) Newborn Object Recognition if $\tilde{l}_k^i$ is empty, matched with the jth detection box in the (k+1)th frame of video sequence and matched with no object in the object template set, determining that the object is a newborn object, allocating an identity $\{l^i\}_{i=n+1}^{M_\Gamma+n}$, and building a newborn object state set:

$$S_\Gamma = \{s_\Gamma^{i}\}_{i=n+1}^{M_\Gamma+n}$$

where $s_\Gamma^{i} = [x_\Gamma^{i}, y_\Gamma^{i}, w_\Gamma^{i}, h_\Gamma^{i}, l^i]$ represents a state vector of a newborn object with the identity $l^i$, $M_\Gamma$ represents the number of newborn objects, and n represents the number of object templates; adding an object identity corresponding to the newborn object to the matched detection box pair, i.e., $\tilde{l}_k^i = l^i$, $\tilde{l}_{k+1}^j = \tilde{l}_k^i$, adding the newborn object into the object template set, and initializing sampling particles of the newborn object;

(2) Missing Object Re-Recognition if $\tilde{l}_k^i$ is empty, matched with the jth detection box in the (k+1)th frame of video sequence and matched with no object in the survival object track set, but is matched with an object with the identity $l^a$ in the object template set, indicating that the object included in the detection box is not detected in the previous frame of video sequence, and is missed; in the kth frame of video sequence, re-recognizing the object, and re-adding the object into the survival object track set:

$$S_k = \{s_k^{i}\}_{i=1}^{M_k} \cup s_k^{la}$$

where $s_k^{i} = [x_k^{i}, y_k^{i}, w_k^{i}, h_k^{i}, l^i]$ represents a state vector of the survival object with the identity $l^i$; and adding an object identity correspondingly the same as the re-recognized object to the matched detection box pair, i.e., $\tilde{l}_k^i = l^a$, $\tilde{l}_{k+1}^j = \tilde{l}_k^i$;

(3) Survival Object Recognition if $l_k^i$ is not empty, determining that the detection box object is a survival object, the identity of the object being $\tilde{l}_k^i$; if $\tilde{l}_k^i$ is empty, but is matched with an object with the identity $l^b$ in the survival object track set, also determining that the detection box object is the survival object, and performing identity assignment on the survival object, i.e., $\tilde{l}_k^i = l^b$; and (4) Clutter Recognition if $\tilde{l}_k^i$ is empty, matched with no detection box in the (k+1)th frame of video sequence and matched with no object in the object template set, determining that the detection box is interference clutter.

Optionally, the method further includes: building an object motion model according to the confidence score of the detection box;

if the object motion model is a random walk model, and when a YOLOv3 detector detects the object and the confidence score $\tilde{C}_k^{i}$ of the detection box is greater than a confidence score threshold value $T_B$, adjusting the state of the object by using the detection box, i.e., $$s_k^{i} = \begin{cases} \eta s_k^{i} + (1-\eta)s_{k-1}^{i} + e(k-1), & \tilde{C}_k^{i} > T_B \\ s_{k-1}^{i} + e(k-1), & \text{others} \end{cases}$$

where $s_{k-1}^{i}$ is a state vector of the object with the identity $l^i$ in the (k−1)th frame of video sequence; $s_k$ is a detection box of the object with the identity $l^i$ in the kth frame of video sequence; the confidence score $\tilde{C}_k^{i}$ of the detection box represents the probability that the detection box includes the object and a score of the matching degree of the detection box and the object; e(k−1) represents zero-mean Gaussian white noise; $\eta$ is a learning rate between the state of the object and corresponding detection box information; and if the confidence score of the detection box is higher, $\eta$ is greater, indicating that a detection result is more trustworthy.

Optionally, in the (k−1)th frame of video sequence, a multiple Bernoulli parameter set $\pi_{k-1} = \{(r_{k-1}^{(l^i)}, p_{k-1}^{(l^i)})\}_{i=1}^{M_{k-1}}$ is used to represent a posterior probability distribution of multiple objects, where $M_{k-1}$ is the number of objects existing in the (k−1)th frame of video sequence, $r_{k-1}^{(l^i)}$ represents the existence probability of the object $l^i$ in the (k−1)th frame of video sequence, and $p_{k-1}^{(l^i)}$ represents a probability distribution of the object $l^i$ in the (k−1)th frame of video sequence, represented by a group of weighted particles:

$$p_{k-1}^{(l^i)}(s) = \sum_{j=1}^{L_{k-1}^{(l^i)}} \omega_{k-1}^{(l^i,j)} \delta_{s_{k-1}^{(l^i,j)}}(s)$$

where $\omega_{k-1}^{(l^i,j)}$ represents a weight of a jth sampling particle of the object $l^i$ in the (k−1)th frame of video sequence, $s_{k-1}^{(l^i,j)}$ represents a state vector of the jth sampling particle of the object $l^i$ in the (k−1)th frame of video sequence, $L_{k-1}^{(l^i,j)}$ is the number of sampling particles of the object $l^i$, and $\delta(\bullet)$ is a Dirac delta function;

the multi-object probability distribution is still a multiple Bernoulli parameter set, represented as:

$$\pi_{k|k-1} = \{(r_{P,k|k-1}^{(l^i)}, p_{P,k|k-1}^{(l^i)})\}_{i=1}^{M_{k-1}} \cup \{(r_{\Gamma,k}^{(l^j)}, p_{\Gamma,k}^{(l^j)})\}_{j=n+1}^{M_{\Gamma,k}+n}$$

A multiple Bernoulli parameter prediction $\{(r_{P,k|k-1}^{(l^i)}, p_{P,k|k-1}^{(l^i)})\}_{i=1}^{M_{k-1}}$ of the survival object may be obtained by the following formula:

$$r_{P,k|k-1}^{(l^i)} = r_{k-1}^{(l^i)} \sum_{j=1}^{L_{k-1}^{(l^i)}} \omega_{k-1}^{(l^i,j)} p_{S,k}\left(s_{k-1}^{(l^i,j)}\right)$$

$$p_{P,k|k-1}^{(l^i)}(s) = \sum_{j=1}^{L_{k-1}^{(l^i)}} \tilde{\omega}_{P,k|k-1}^{(l^i,j)} \delta_{s_{P,k|k-1}^{(l^i,j)}}(s)$$

where, $$s_{P,k|k-1}^{(l^i,j)} \sim f_{k|k-1}\left(\cdot \mid s_{k-1}^{(l^i,j)}\right)$$

$$\tilde{\omega}_{P,k|k-1}^{(l^i,j)} = \frac{\omega_{P,k|k-1}^{(l^i,j)}}{\sum_{j=1}^{L_{k-1}^{(l^i)}} \omega_{P,k|k-1}^{(l^i,j)}}$$

$$\omega_{P,k|k-1}^{(l^i,j)} = \omega_{k-1}^{(l^i,j)}$$

$f_{k|k-1}(\bullet|s_{k-1}^{(l^i,j)})$ is a state transfer function, obtained by calculation by using the random walk model through the following formula:

$$f_{k|k-1}\left(\cdot \mid s_{k-1}^{(l^i,j)}\right) = N\left(\cdot\,;\mu_{k-1}^i, e(k-1)\right)$$

where, $$\mu_{k-1}^i = \begin{cases} \eta s_k^{l^i} + (1-\eta)s_{k-1}^{l^i}, & \tilde{c}_k^{l^i} > T_B \\ s_{k-1}^{l^i}, & \text{others} \end{cases}$$

$$e(k-1) = \sum_{j=1}^{L_{k-1}^{(l^i)}} \omega_{k|k-1}^{(l^i,j)}\left(\mu_{k-1}^{l^i} - s_{k-1}^{(l^i,j)}\right)\left(\mu_{k-1}^{l^i} - s_{k-1}^{(l^i,j)}\right)^H$$

The multiple Bernoulli parameter set $\{(r_{\Gamma,k}^{(l^j)}, p_{\Gamma,k}^{(l^j)})\}_{j=n+1}^{M_{\Gamma,k}+n}$ of the newborn object may be obtained by calculation through the following formula:

$$r_{\Gamma,k}^{(l^j)} = \tilde{c}_k^{l^j}$$

$$p_{\Gamma,k}^{(l^j)}(s_\Gamma) = \sum_{i=1}^{L_{k-1}^{(l^j)}} \omega_{k-1}^{(l^j,i)} \delta_{s_{\Gamma,k-1}^{(l^j,i)}}(s_\Gamma)$$

where $M_{\Gamma,k}$ is the number of newborn objects in the kth frame of video sequence.

Optionally, if the multi-object prediction probability distribution in the (k−1)th frame of video sequence is:

$$\pi_{k|k-1} = \{(r_{k|k-1}^{(l^i)}, p_{k|k-1}^{(l^i)})\}_{i=1}^{M_{k|k-1}}, M_{k|k-1} = M_{k-1} + M_{\Gamma,k}$$

the posterior probability distribution of the multiple objects is updated through measurement likelihood of the particles:

$$\pi_k = \{(r_k^{(l^i)}, p_k^{(l^i)})\}_{i=1}^{M_k}$$

An updated multiple Bernoulli parameter set is obtained according to the following formula:

$$r_k^{(l^i)} = \frac{r_{k|k-1}^{(l^i)} \varepsilon_k^{(l^i)}}{1 - r_{k|k-1}^{(l^i)} + r_{k|k-1}^{(l^i)} \varepsilon_k^{(l^i)}}$$

$$w_k^{(l^i,j)} = \frac{1}{\varepsilon_k^{(l^i)}} w_{k|k-1}^{(l^i,j)} g_{T_k^{l^i}}\left(f_{s_{k|k-1}^{(l^i,j)}}\right)$$

$$p_k^{(l^i)} = \frac{1}{\varepsilon_k^{(l^i)}} \sum_{j=1}^{L_{k|k-1}^{(l^i)}} w_{k|k-1}^{(l^i,j)} g_{T_k^{l^i}}\left(f_{s_{k|k-1}^{(l^i,j)}}\right) \delta_{s_{k|k-1}^{(l^i,j)}}(s)$$

where $$f_{s_{k|k-1}^{(l^i,j)}}$$

is a convolution feature of the particle $$s_{k|k-1}^{(l^i,j)}, \varepsilon_k^{(l^i)} = \sum_{j=1}^{L_{k|k-1}^{(l^i)}} w_{k|k-1}^{(l^i,j)} g_{T_k^{l^i}}\left(f_{s_{k|k-1}^{(l^i,j)}}\right), g_{T_k^{l^i}}\left(f_{s_{k|k-1}^{(l^i,j)}}\right)$$

is measurement likelihood between the convolution feature $T_k^{l^i}$ of the template corresponding to the object $l^i$ and the feature of the particle $s_{k|k-1}^{(l^i,j)}$. The calculation process is consistent with the calculation process of elements of the similarity matrix.

Optionally, in the motion process of the object, the object template is updated by fusing a track of the survival object, the object template and an object detection result, i.e.:

$$f_k^{l^i} = \begin{cases} \left((1-\rho)f_{k-1}^{l^i} + \rho \hat{f}_{k-1}^{l^i}\right)(1-\tilde{\eta}) + \tilde{\eta}\tilde{f}_k^{l^i}, & \tilde{C}_k^{l^i} > T_B \\ (1-\rho)f_{k-1}^{l^i} + \rho \hat{f}_{k-1}^{l^i}, & \text{others} \end{cases}$$

where $f_k^{l^i}$ and $f_{k-1}^{l^i}$ respectively represent convolution feature templates corresponding to the objects $l^i$ in the kth and (k−1)th frames of video sequences, $\hat{f}_{k-1}^{l^i}$ is a sparse representation of convolution features of a tracking result of the object $l^i$ in the (k−1)th frame of video sequence, $\tilde{f}_k^{l^i}$ is a sparse representation of convolution features of the detection box of the object $l^i$ in the kth frame of video sequence, $\rho$ is a learning rate of a template, $\tilde{C}_k^{l^i}$ is a confidence score of the corresponding detection box of the object $l^i$ in the kth frame of video sequence, and $\tilde{\eta}$ is a learning rate of the detection box.

Optionally, in the detection and tracking process, when the intersection over union IOU of two adjacent object boxes is greater than the threshold value $T_u$, determining that the two objects are occluded.

At this time, (1) when the detector can detect the two objects, indicating that the objects are slightly occluded, performing adaptive updating on the object template; (2) when only one object can be detected by the detector, determining that the other object is an occluded object, and stopping template updating for the occluded object; and using a displacement difference of two previous frames of the object to estimate a real-time speed v and a motion direction θ of the object so as to predict the object, and keeping the size of the object box unchanged; (3) when the two objects cannot be detected by the detector, determining an occluded object according to the similarity of the object box and the template, and treating the occluded object by using the same way in the situation (2); if the object disappears or is lost in the tracking process, re-recognizing the object according to the detection result and matching of the object templates when the object is separated or reappears.

The disclosure has the beneficial effects that:

By introducing the YOLOv3 technology to detect the multiple targets in the video sequences and taking the multiple objects as newborn targets, under the consideration of the problems of over- or under-detection of the objects and inaccurate detection results, anti-interference convolution features are used to describe details of the objects deeply, and the states of the objects are accurately estimated by means of an adaptive particle filter multiple Bernoulli (PFMB) method. In the disclosure, the detection result and the tracking result are interactively fused to improve the estimation accuracy of the states of the multiple objects. Aiming to the problems of detection errors and inaccurate detection results of YOLOv3 for video multi-object detection in a complex environment, the disclosure incorporates the YOLOv3 detection method under a PFMB filtering framework, which not only solves the problems of estimation of unknown newborn objects and recognition of identities of the objects in the PFMB method, meanwhile, the detection confidence score and the filtering likelihood are fused and molded, can also effectively improve the tracking accuracy of the multiple objects with varying number of videos under the complex environment.

BRIEF DESCRIPTION OF FIGURES

In order to explain the technical solution in the example of the disclosure more clearly, the accompanying drawings used in the description of the example are briefly introduced below. It is apparent that the accompanying drawings in the following description are only some examples of the disclosure. For those of ordinary skill in the art, other drawings can be obtained according to these drawings without paying creative labor.

DETAILED DESCRIPTION

Figure 1:
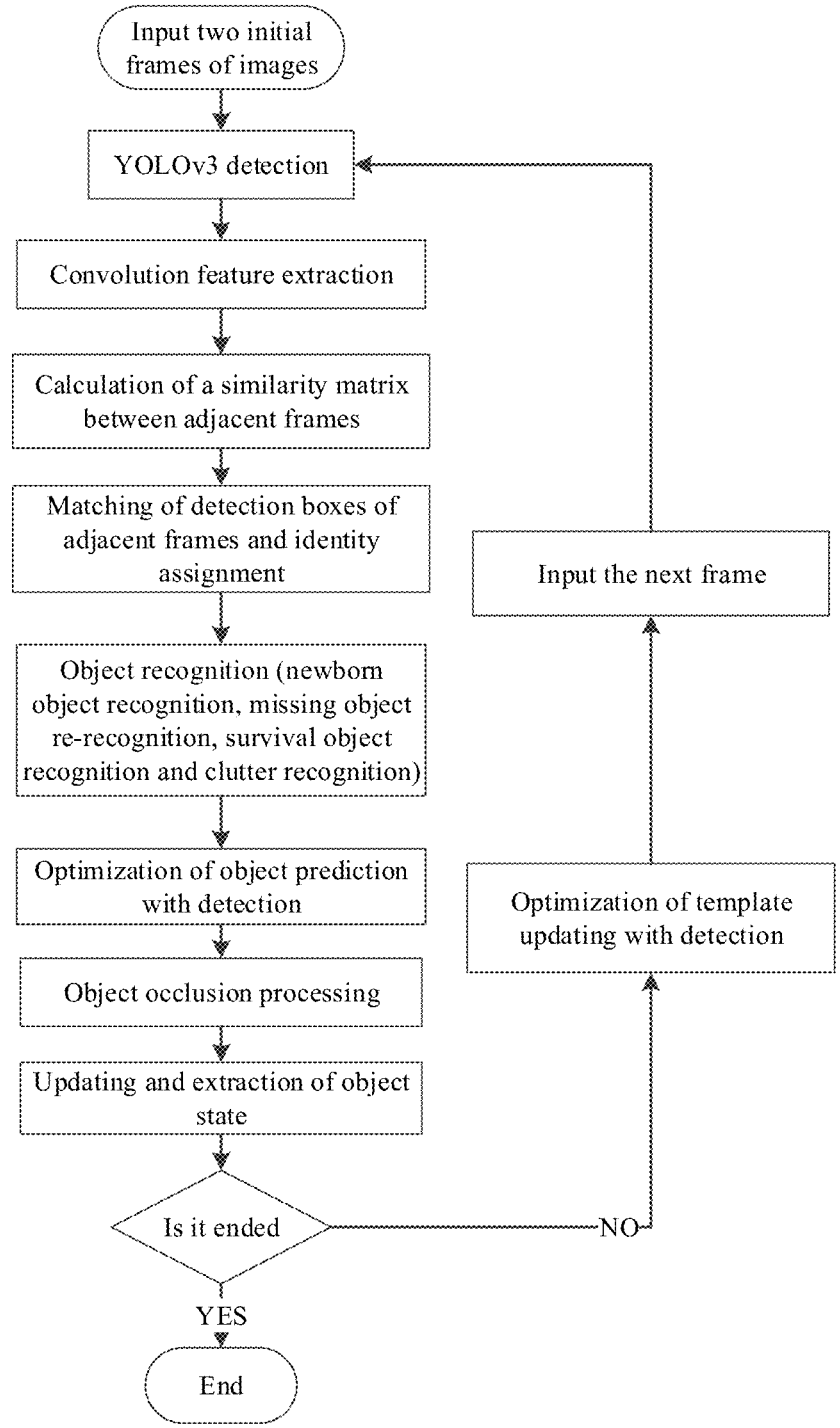
FIG. 1 is a framework diagram of a method of the disclosure.

In order to make the objectives, technical solutions and advantages of the disclosure clearer, the implementations of the disclosure will be further described in detail below in combination with the accompanying drawings.

Firstly, related contents involved in the disclosure are introduced below.

1. Multiple Bernoulli Filtering Principle

In a space $\chi$, a multi-object state RFS is represented as $X=\{X^{(1)}, \ldots, X^{(M)}\}$, and $X^{(i)}=\{(r^{(i)}, p^{(i)})\}$ is an ith object component. The posterior probability distribution of objects is parameterized through Bernoulli parameters $(r^{(i)}, p^{(i)})$. $r^{(i)}$ and $p^{(i)}$ respectively represent the existence probability and the probability distribution of the ith object. MBF iteratively updates the posterior probability distribution of the multiple objects by using the Bayesian theory, so as to realize state estimation for the multiple objects.

It is assumed that the posterior probability distribution of the multiple objects of a (k−1)th frame is:

$$\pi_{-1} = \{(r_{k-1}^{(i)}, p_{k-1}^{(i)})\}_{i=1}^{M_{k-1}}$$

$M_{k-1}$ represents the number of survival objects of the (k−1)th frame. A predicted multi-object probability distribution may be represented as:

$$\pi_{k|k-1} = \{(r_{p,k|k-1}^{(i)}, p_{p,k|k-1}^{(i)})\}_{i=1}^{M_{k-1}} \cup \{(r_{\Gamma,k}^{(j)}, p_{\Gamma,k}^{(j)})\}_{j=1}^{M_{\Gamma,k}}$$

which is composed of a multiple Bernoulli parameter $\{(r_{p,k|k-1}^{(i)}, p_{p,k|k-1}^{(i)})\}_{i=1}^{M_{k-1}}$ of the survival objects of the (k−1)th frame and a multiple Bernoulli parameter $\{(r_{\Gamma,k}^{(j)}, p_{\Gamma,k}^{(j)})\}_{j=1}^{M_{\Gamma,k}}$ of newborn objects of a kth frame, where $$r_{p,k|k-1}^{(i)} = r_{k-1}^{(i)} \langle p_{k-1}^{(i)}, P_{S,k} \rangle$$

$$p_{p,k|k-1}^{(i)}(x) = \frac{\langle f_{k|k-1}(x|\cdot), p_{k-1}^{(i)} P_{S,k} \rangle}{\langle p_{k-1}^{(i)}, P_{S,k} \rangle}$$

$\langle f_1(\bullet), f_2(\bullet) \rangle$ represents a standard inner product $\int f_1(x) f_2(x)dx$, $P_{S,k}$ is a survival probability of an object, $f_{k|k-1}(x|\bullet)$ is an object state transfer function, and $M_{\Gamma,k}$ represents the number of the newborn objects of the kth frame.

If the predicted multi-object probability distribution of the kth frame is:

$$\pi_{k|k-1} = \{(r_{k|k-1}^{(i)}, p_{k|k-1}^{(i)})\}_{i=1}^{M_{k|k-1}},$$

an updated multi-object posterior probability density may be approximately represented by a multiple Bernoulli parameter $\{(r_{L,k}^{(i)}, p_{L,k}^{(i)})\}_{i=1}^{M_{k|k-1}}$ of an undetected object and an updated multiple Bernoulli parameter $\{(r_{U,k}(z), P_{U,k}(\bullet;z))\}_{z \in Z_k}$, i.e.:

$$\pi_k \approx \{(r_{L,k}^{(i)}, p_{L,k}^{(i)})\}_{i=1}^{M_{k|k-1}} \cup \{(r_{U,k}(z), P_{U,k}(\bullet;z))\}_{z \in Z_k}$$

where, $$r_{L,k}^{(i)} = r_{k|k-1}^{(i)} \frac{1 - \langle p_{k|k-1}^{(i)}, p_{D,k} \rangle}{1 - r_{k|k-1}^{(i)} \langle p_{k|k-1}^{(i)}, P_{D,k} \rangle}$$

$$p_{L,k}^{(i)}(x) = p_{k|k-1}^{(i)}(x) = \frac{1 - p_{D,k}(x)}{1 - \langle p_{k|k-1}^{(i)}, p_{D,k} \rangle}$$

$$r_{U,k}(z) = \frac{\sum_{i=1}^{M_{k|k-1}} \frac{r_{k|k-1}^{(i)} \langle p_{k|k-1}^{(i)}, \psi_{k,z} \rangle}{1 - r_{k|k-1}^{(i)} \langle p_{k|k-1}^{(i)}, P_{D,k} \rangle}}{\kappa_k(z) \sum_{i=1}^{M_{k|k-1}} \frac{r_{k|k-1}^{(i)} \langle p_{k|k-1}^{(i)} \psi_{k,z} \rangle}{1 - r_{k|k-1}^{(i)} \langle p_{k|k-1}^{(i)}, P_{D,k} \rangle}}$$

$$p_{U,k}(x;z) = \frac{\sum_{i=1}^{M_{k|k-1}} \frac{r_{k|k-1}^{(i)} p_{k|k-1}^{(i)}(x) \psi_{k,z}(x)}{1 - r_{k|k-1}^{(i)} \langle p_{k|k-1}^{(i)}, P_{D,k} \rangle}}{\sum_{i=1}^{M_{k|k-1}} \frac{r_{k|k-1}^{(i)} \langle p_{k|k-1}^{(i)}, \psi_{k,z} \rangle}{1 - r_{k|k-1}^{(i)} \langle p_{k|k-1}^{(i)}, P_{D,k} \rangle}}$$

$$\psi_{k,z} = g_k(z|x) p_{D,k}(x)$$

$p_{D,k}(x)$ is an object detection probability, $g_k(z|x)$ represents a measurement likelihood function, $Z_k$ and $\kappa_k(Z)$ respectively represent a measurement set and a noise wave density function, and the number of objects of the kth frame is estimated as $M_k = M_{k|k-1} + |Z_k|$.

2. YOLOv3 Object Detection

Figure 2:
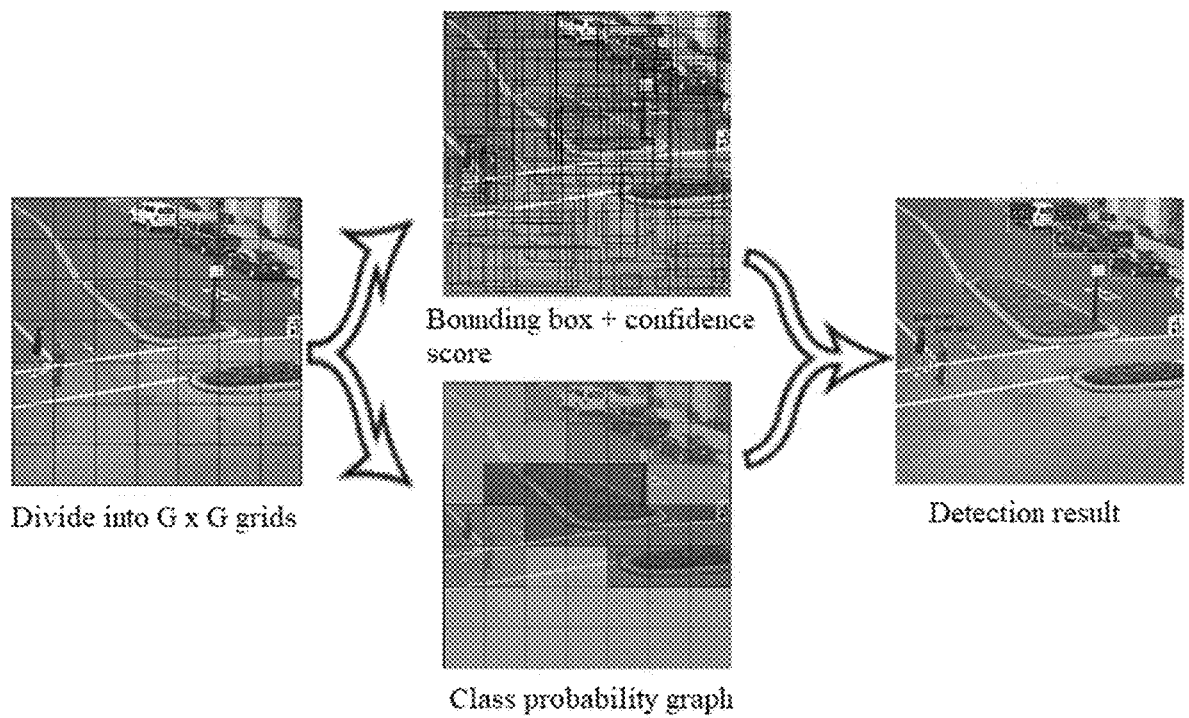
FIG. 2 is a schematic diagram of a working principle of YOLOv3.

The working principle of YOLOv3 is as shown in FIG. 2.

Figure 3:
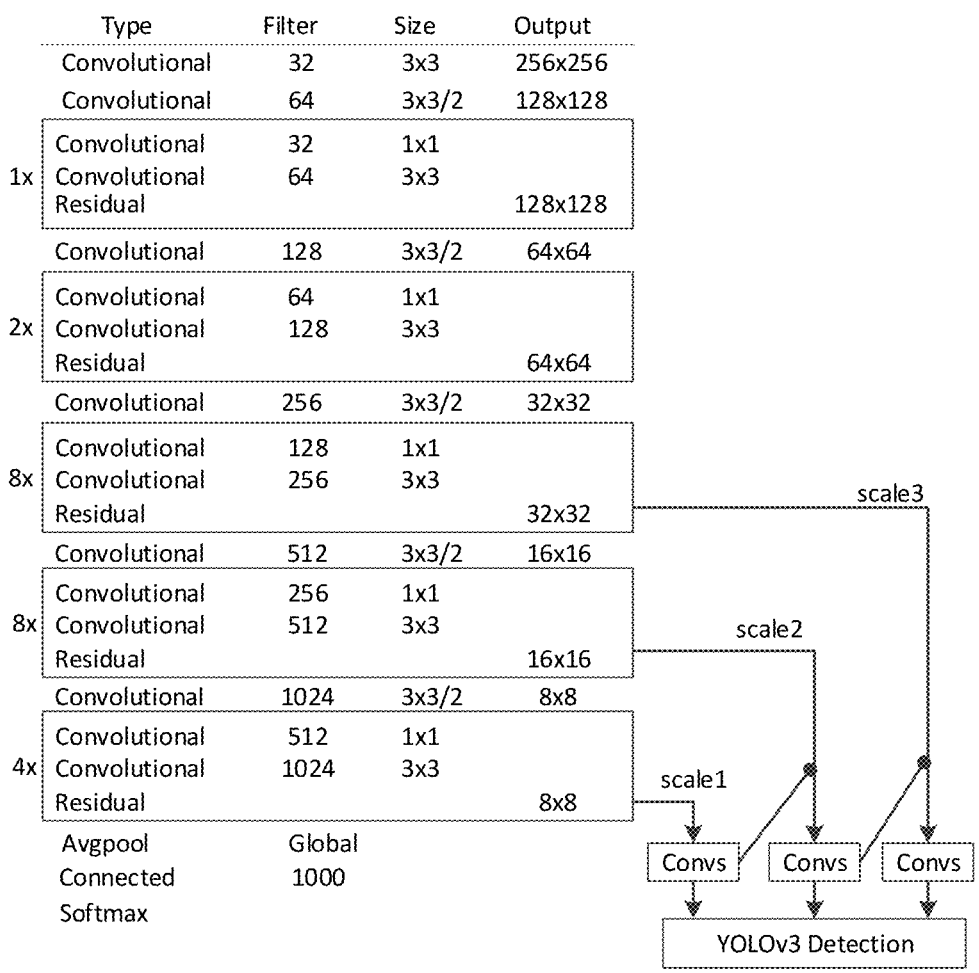
FIG. 3 is a network structure diagram of YOLOv3.

YOLOv3 uses Darknet-53 as a feature extraction network. The structure of the network is as shown in FIG. 3, and consists of continuous 3×3 and 1×1 convolutional layers. Residual blocks of a residual neural network (ResNet) are fused to divide the whole network into multiple sub-sections for stage-by-stage training. A residual of each sub-section is trained by means of shortcut connection, thereby achieving a minimum overall residual.

YOLOv3 predicts bounding boxes on three different scales. Three bounding boxes are predicted on each scale. Local feature interaction is performed in the scale. After a basic network, a series of convolutional layers are added to obtain feature maps. On this basis, position regression and classification are performed, and this process is minimum scale prediction. A sample on the convolutional layer in the previous scale is connected to the last feature map of a 16×16 size, and predicted information is output after subjecting to multiple convolutions. In the similar way, a sample on the convolutional layer in the middle scale is connected to the last feature map of a 32×32 size, and a bounding box prediction on the maximum scale is obtained after a series of convolutions.

YOLOv3 uses the idea of an anchor box in Faster R-CNN to generate priors of nine bounding boxes through a k-means clustering method, and each size predicts three bounding boxes. YOLOv3 divides an image into G×G grids, and the tensor predicted in each scale is G×G×[3*(4+1+80)], where digit 3 represents three predicted bounding boxes, digit 4 represents that each predicted bounding box includes four deviation values $(t_x, t_y, t_w, t_h)$, $(t_x, t_y, t_w, t_h)$ which are are deviation values of center coordinates of the predicted bounding box and deviation values of the width and the height, digit 1 represents a confidence score of the bounding box, and digit 80 represents that the predicated bounding box belongs to the conditional class probability $P_r(Class_i/Object)$ of 80 classes of objects.

The bounding box uses a sum of squared error loss during training. The confidence score of the bounding box consists of the probability $P_r(object)$ that the bounding box includes an object and the accuracy $IOU_{pred}^{truth}$ of the bounding box:

$$P_r(object) * IOU_{pred}^{truth}$$

If the bounding box does not include an object, the value of $P_r(object)$ is 0, and the confidence score is 0, or the value of $P_r(object)$ is 1. The confidence score is an intersection over union between a predicted box and a real box. The conditional class probability $P_r(Class_i/Object)$ represents a probability that the bounding box belongs to a certain class when the bounding box includes an object. The class specific confidence score (C) of the bounding box is obtained by YOLOv3 in combination with the conditional class probability and the confidence score of the bounding box, and represents the probability that the object included in the bounding box is classified to each class and the matching quality between the bounding box and the object. The bounding box class confidence score may be represented as:

$$C = P_r(Class_i/Object) \times P_r(Object) \times IOU_{pred}^{truth}$$

Example I

The example provides a visual multi-object tracking based on multi-Bernoulli filter with YOLOv3 detection. Referring to FIG. 1, the method includes the following steps.

Step I: Initialization 1.1 Parameter initialization: the initial moment is k=0, the total number of frames of a video is N, the maximum number of initialized sampling particles is $L_{max}$, the minimum number of particles is $L_{min}$, and the existence probability of initial objects is $P_s$=0.99.

1.2 Object Detection kth and (k+1)th frames of video sequences are detected by using a YOLOv3 algorithm;

the number of detection boxes in the kth frame of video sequence is recorded as n, and a detection box state set is recorded as $\tilde{S}_k = \{\tilde{s}_k^{\tilde{l}_k^i}\}_{i=1}^n$;

the number of detection boxes in the (k+1)th frame of video sequence is recorded as m, and a detection box state set is recorded as $\tilde{S}_k = \{\tilde{s}_{k+1}^{\tilde{l}_{k+1}^i}\}_{i=1}^m$;

$\tilde{s}_k^{\tilde{l}_k^i} = [\tilde{x}_k^{\tilde{l}_k^i}, \tilde{y}_k^{\tilde{l}_k^i}, \tilde{w}_k^{\tilde{l}_k^i}, \tilde{h}_k^{\tilde{l}_k^i}, \tilde{l}_k^i]$ represents a state vector of an ith detection box in the kth frame of video sequence, and the parameters $\tilde{x}_k^{\tilde{l}_k^i}, \tilde{y}_k^{\tilde{l}_k^i}, \tilde{w}_k^{\tilde{l}_k^i}, \tilde{h}_k^{\tilde{l}_k^i}, \tilde{l}_k^i$ respectively represent an x coordinate and a y coordinate of the upper left corner of the ith detection box in the kth frame of video sequence, and the width, the height and the identity of the detection box.

1.3 Matching of Object Boxes of an Initial Frame

In case of k=0, the detection boxes in the kth and (k+1)th frames of video sequences are represented by using anti-interference convolution features, and are respectively recorded as $\tilde{F}_k = \{\tilde{f}_k^1, \tilde{f}_k^2, \ldots \tilde{f}_k^n\}$ and $\tilde{F}_{k+1} = \{\tilde{f}_{k+1}^1, \tilde{f}_{k+1}^2, \ldots \tilde{f}_{k+1}^m\}$, where $\tilde{f}_k^i$ represents a convolution feature vector of the ith detection box in the kth frame of video sequence; and a similarity matrix $\Lambda$ corresponding to convolution features of the detection box is calculated, that is:

$$\Lambda = \begin{bmatrix} e_{11} & \cdots & e_{1m} \\ e_{21} & \cdots & e_{2m} \\ \vdots & \ddots & \vdots \\ e_{n1} & \cdots & e_{nm} \end{bmatrix}$$

$e_{ij} = e^{-\|\tilde{f}_k^i - \tilde{f}_{k+1}^j\|_2^1}$ represents the similarity between the ith detection box in the kth frame of video sequence and a jth detection frame in the (k+1)th frame of video sequence; and two detection boxes with maximum similarity values and greater than a similarity threshold value $T_l$ are selected from each row of the similarity matrix $\Lambda$ as matching results, and a finally matched detection box pair is added into an object template set and an object track set as initial newborn objects.

Since the objects in the various frames of a video continuously change, if a same object does not have an extremely large displacement change in two adjacent frames of video sequences, on the basis of similar likelihood matching, an intersection over union IOU of an object box is added as a limit: if the intersection over union IOU of the two detection boxes is greater than an intersection over union threshold value $T_u$, it is determined that the two detection boxes are matched. Two detection boxes with maximum similarity values and greater than the similarity threshold value $T_l$ and the intersection over union IOU greater than the intersection over union threshold value $T_u$ are selected from each row of the similarity matrix $\Lambda$ as a matched result, an identity $\{l^i\}_{i=1}^{M_k}$ is allocated to the finally matched detection box pair as an initial newborn object, and the matched detection box pair is added into the object track set $S_k = \{s_k^{l^i}\}_{i=1}^{M_k}$, $s_k^{l^i} = [x_k^{l^i}, y_k^{l^i}, w_k^{l^i}, h_k^{l^i}, l^i]$ is an object state vector, various components respectively represent an x coordinate and a y coordinate of the upper left corner of the ith object box and the width, the height and the identity of the object box, and $M_k$ is the number of the objects in the kth frame of video sequence; an object identity, i.e., $\tilde{l}_k^i = l^i$, $\tilde{l}_{k+1}^j = l^i$, corresponding to the initial newborn object is added to the matched detection box pair, and a newborn object template is built.

Step II: Object Recognition

In case of k>0, determining whether an object is a newborn object, a re-recognized object or a survival object according to the detection boxes of adjacent frames, an object template set and a survival object track set.

2.1 Matching of Detection Boxes

A similarity matrix $\Lambda$ between the detection boxes in the kth and (k+1)th frames of video sequences is calculated; two detection boxes with maximum similarity values and greater than the similarity threshold value $T_l$ are selected from each row of the similarity matrix $\Lambda$; it is determined that the two detection boxes are matched if the intersection over union IOU of the two detection boxes is greater than the intersection over union threshold value $T_u$, and the identity of the matched object in the (k+1)th frame of video sequence is assigned if the ith detection box in the kth frame is matched with the jth detection box in the (k+1)th frame, that is:

$\tilde{l}_{k+1}^j = \tilde{l}_k^i$ $\tilde{l}_k^i$ represents the identity of the ith detection box in the kth frame of video sequence, and if $\tilde{l}_k^i$ is empty, it is indicated that an object included in the detection box is not detected in a (k−1)th frame of video sequence.

2.2 Object Recognition (1) Newborn Object Recognition

If $l_k^i$ is empty, matched with the jth detection box in the (k+1)th frame of video sequence and matched with no object in the object template set, it is determined that the object is a newborn object, an identity $\{l^i\}_{i=n+1}^{M_\Gamma+n}$ is allocated, and a newborn object state set is built:

$S_\Gamma = \{s_\Gamma^{l^i}\}_{i=n+1}^{M_\Gamma+n}$ $s_\Gamma^{l^i} = [x_\Gamma^{l^i}, y_\Gamma^{l^i}, w_\Gamma^{l^i}, h_\Gamma^{l^i}, l^i]$ represents a state vector of a newborn object with the identity $l^i$, $M_\Gamma$ represents the number of newborn objects, and n represents the number of object templates. An object identity corresponding to the newborn object is added to the matched detection box pair, i.e., $\tilde{l}_k^i = l^i$, $\tilde{l}_{k+1}^j = \tilde{l}_k^i$; the newborn object is added into the object template set, and sampling particles of the new object are initialized.

(2) Missing Object Re-Recognition

If $l_k^i$ is empty, matched with the jth detection box in the (k+1)th frame of video sequence and matched with no object in the survival object track set, but is matched with an object with the identity $l^a$ in the object template set, it is indicated that the object included in the detection box is not detected in the previous frame, and is missed; in the kth frame of video sequence, the object is re-recognized, and the object is re-added into the survival object track set:

$S_k = \{s_k^{l^i}\}_{i=1}^{M_k} \cup s_k^{l^a}$ $s_k^{l^i} = [x_k^{l^i}, y_k^{l^i}, w_k^{l^i}, h_k^{l^i}, l^i]$ represents a state vector of the survival object with the identity $l^i$. An object identity that is correspondingly the same as the re-recognized object is added to the matched detection box pair, i.e., $\tilde{l}_k^i = l^a$, $\tilde{l}_{k+1}^j = \tilde{l}_k^i$.

(3) Survival Object Recognition

If $l_k^i$ is not empty, it is determined that the detection box object is a survival object, the identity of the object is $\tilde{l}_k^i$. If $\tilde{l}_k^i$ is empty, but is matched with the object with the identity $l^b$ in the survival object track set, it is also determined that the detection box object is the survival object, and identity assignment is performed on the survival object, i.e., $\tilde{l}_k^i = l^b$ (4) Clutter Recognition If $l_k^i$ is empty, matched with no detection box in the (k+1)th frame of video sequence and matched with no object in the object template set, it is determined that the detection box is an interference clutter.

Step III: Object Prediction 3.1 Object Motion Model

If the object motion model is a random walk model, and when a YOLOv3 detector detects the object and the confidence score $\tilde{C}_k^{l^i}$ of the detection box is greater than a confidence score threshold value $T_B$, the state of the object is adjusted by using the detection box, i.e., $$s_k^{l^i} = \begin{cases} \eta \tilde{s}_k^{l^i} + (1+\eta)s_{k-1}^{l^i} + e(k-1), & \tilde{C}_k^{l^i} > T_B \\ s_{k-1}^{l^i} + e(k-1), & \text{others} \end{cases}$$

$s_{k-1}^{l^i}$ is a state vector of the object with the identity $l^i$ in the (k−1)th frame of video sequence; $\tilde{s}_k^{l^i}$ is a detection box of the object with the identity $l^i$ in the kth frame of video sequence; the confidence score $\tilde{C}_k^{l^i}$ of the detection box represents the probability that the detection box includes the object and a score of the matching degree of the detection box and the object; e(k−1) represents zero-mean Gaussian white noise; η is a learning rate between the state of the object and corresponding detection box information; and if the confidence score of the detection box is higher, r is greater, which indicates that a detection result is more trustworthy. The state of the object is adjusted by using a good detection box to eliminate an accumulation error caused by long-time tracking, so as to better optimize a prediction result.

3.2 Object Prediction

In the (k−1)th frame of video sequence, a multiple Bernoulli parameter set $\pi_{k-1} = \{(r_{k-1}^{(l^i)}, p_{k-1}^{(l^i)})\}_{i=1}^{M_{k-1}}$ is used to represent a posterior probability distribution of multiple objects, $M_{k-1}$ is the number of objects existing in the (k−1)th frame of video sequence, $r_{k-1}^{(l^i)}$ represents the existence probability of the object $l^i$ in the (k−1)th frame of video sequence, and $p_{k-1}^{(l^i)}$ represents a probability distribution of the object $l^i$ in the (k−1)th frame of video sequence, represented by a group of weighted particles:

$$p_{k-1}^{(l^i)}(s) = \sum_{j=1}^{L_{k-1}^{(l^i)}} \omega_{k-1}^{(l^i,j)} \delta_{s_{k-1}^{(l^i,j)}}(s)$$

$\omega_{k-1}^{(l^i,j)}$ represents a weight of a jth sampling particle of the object $l^i$ in the (k−1)th frame of video sequence, $s_{k-1}^{(l^i,j)}$ represents a state vector of the jth sampling particle of the object $l^i$ in the (k−1)th frame of video sequence, $L_{k-1}^{(l^i)}$ is the number of sampling particles of the object $l^i$, and δ(•) is a Dirac delta function.

The multi-object probability distribution is still a multiple Bernoulli parameter set, which is represented as:

$$\pi_{k|k-1} = \{(r_{P,k|k-1}^{(l^i)}, p_{P,k|k-1}^{(l^i)})\}_{i=1}^{M_{k-1}} \cup \{(r_{\Gamma,k}^{(l^j)}, p_{\Gamma,k}^{(l^j)})\}_{j=n+1}^{M_{\Gamma,k}+n}$$

A multiple Bernoulli parameter prediction $\{(r_{P,k|k-1}^{(l^i)}, p_{P,k|k-1}^{(l^i)})\}_{i=1}^{M_{k-1}}$ of the survival object may be obtained by the following formula:

$$r_{P,k|k-1}^{(l^i)} = r_{k-1}^{(l^i)} \sum_{j=1}^{L_{k-1}^{(l^i)}} \omega_{k-1}^{(l^i,j)} p_{S,k}(s_{k-1}^{(l^i,j)})$$

$$p_{P,k|k-1}^{(l^i)}(s) = \sum_{j=1}^{L_{k-1}^{(l^i)}} \tilde{\omega}_{P,k|k-1}^{(l^i,j)} \delta_{s_{P,k|k-1}^{(l^i,j)}}(s)$$

where, $$s_{P,k|k-1}^{(l^i,j)} \sim f_{k|k-1}\left(\cdot \middle| s_{k-1}^{(l^i,j)}\right)$$

$$\tilde{\omega}_{P,k|k-1}^{(l^i,j)} = \frac{\omega_{P,k|k-1}^{(l^i,j)}}{\sum_{j=1}^{L_{k-1}^{(l^i)}} \omega_{P,k|k-1}^{(l^i,j)}}$$

$$\omega_{P,k|k-1}^{(l^i,j)} = \omega_{k-1}^{(l^i,j)}$$

$f_{k|k-1}(\cdot|s_{k-1}^{(l^i,j)})$ is a state transfer function, which is obtained by calculation by using the random walk model through the following formula:

$$f_{k|k-1}\left(\cdot \middle| s_{k-1}^{(l^i,j)}\right) = N\left(\cdot; \mu_{k-1}^{l^i}, e(k-1)\right)$$

where, $$\mu_{k-1}^{l^i} = \begin{cases} \eta \tilde{s}_k^{l^i} + (1-\eta)s_{k-1}^{l^i}, & \tilde{C}_k^{l^i} > T_B \\ s_{k-1}^{l^i}, & \text{others} \end{cases}$$

$$e(k-1) = \sum_{j=1}^{L_{k-1}^{(l^i)}} \omega_{k|k-1}^{(l^i,j)} \left(\mu_{k-1}^{l^i} - s_{k-1}^{(l^i,j)}\right)\left(\mu_{k-1}^{l^i} - s_{k-1}^{(l^i,j)}\right)^H$$

The multiple Bernoulli parameter set $\{(r_{\Gamma,k}^{(l^j)}, p_{\Gamma,k}^{(l^j)})\}_{j=n+1}^{M_{\Gamma,k}+n}$ of the newborn object may be obtained by calculation through the following formula:

$$r_{\Gamma,k}^{(l^j)} = \tilde{C}_k^{l^j}$$

$$p_{\Gamma,k}^{(l^j)}(s_\Gamma) = \sum_{i=1}^{L_{k-1}^{(l^j)}} \omega_{k-1}^{(l^j,i)} \delta_{s_{\Gamma,k-1}^{(l^j,i)}}(s_\Gamma)$$

$M_{\Gamma,k}$ is the number of newborn objects in the kth frame of video sequence.

Step IV: Similarity Calculation 4.1 Object Convolution Feature Extraction (1) Construction of Convolution Kernels Around the object box, m background sample boxes are randomly sampled by a rectangular box of a same size as the object box. A distance between the background sample boxes and the center position of the object box is required to be greater than ¼ of the width of the object box in a horizontal direction or greater than ¼ of the height of the object box in a vertical direction. Then, the sizes of the object box and the background sample boxes are normalized to be n×n, and images are grayed to obtain a sample set {I, $B_1, B_2, \ldots, B_m$}, I represents an image of the object box, and $B_L$ is an image of an ith background sample. A sliding window with a size of w×w is used to perform a convolution operation on images of the sample set at a step length Δ to obtain an object image block set y={Y$_1$, Y$_2$, . . . , Y$_2$} and a background image block set $$z = \bigcup_{i=1}^{m} \{Z_{i1}, Z_{i2}, \ldots, Z_{il}\}, Y_i \in R^{w \times w}, Z_{ij} \in R^{w \times w} \text{ and}$$
$$l = (n - w + \Delta)^2.$$

In order to maintain gradient information and lower the brightness influence, all image blocks are subtracted by respective mean values and subjected to two-norm normalization processing. Finally, d image blocks are selected from the object image block set as object convolution kernels by using a k-means algorithm:

$$F^o = \{F_1^o, \ldots, F_d^o\} \subset y.$$

m×d background image blocks $$\bigcup_{i=1}^{m} \{F_{i,1}^b, \ldots, F_{i,d}^b\}$$

are selected from the background image block set corresponding to the m background samples, and these image blocks are subjected to average pooling to obtain background convolution kernels:

$$F^b = \left\{ F_1^b = \frac{1}{m}\sum_{i=1}^{m} F_{i,1}^b, \ldots, F_d^b = \frac{1}{m}\sum_{i=1}^{m} F_{i,d}^b \right\}$$

(2) Extraction of Convolution Features

A convolution operation $C_i^o = F_i^o \otimes I$ is performed by the step length Δ on an object image I by using the extracted object convolution kernel to extract an object feature map $$\bigcup_{i=1}^{d} \{C_i^o\}, C_i^0 \in R^{(n-w+\Delta) \times (n-w+\Delta)}.$$

Meanwhile, the background convolution kernels extracted in (1) are used to perform the convolution $C_i^b = F_i^b \otimes I$ on the image I at the step length Δ to obtain a corresponding background feature map $$\bigcup_{i=1}^{d} \{C_i^b\}.$$

Background information deduction is performed on the object feature map:

$$C_i = C_i^o - C_i^b = (F_i^o - F_i^b) \otimes I, i=1, \ldots, d.$$

Feature maps $$C = \bigcup_{i=1}^{d} \{C_i\}$$

with deducted background information are extracted, and are unfolded according to rows and sequentially spliced, so as to obtain a final one-dimensional convolution feature f, $f \in R^{(n-w+\Delta)^2 d}$.

4.2 Sparse Representation of Features

A feature map set is regarded as a three-dimensional tensor $C \in R^{(n-w+\Delta) \times (n-w+\Delta)}$, the tensor is subjected to sparse representation to highlight the features of an object. A sparse vector f is used to approach vec(C) to minimize the following object function:

$$\hat{f} = \operatorname{argmin}_c \left( \lambda \|f\|_1^1 + \frac{1}{2} \|f - vec(C)\|_2^2 \right)$$

vec(C) is a column vector of all elements in a tandem C, $vec(C) \in R^{(n-w+\Delta)^2 d}$. A unique solution of sparse representation is obtained by a soft-shrinking method:

$$\hat{f} = \text{sign}(vec(C))\max(0, \text{abs}(vec(C) - \lambda))$$

λ is a median of the tensor C.

4.3 Similarity Calculation

A calculation formula of the similarity of two object boxes is:

$$p = e^{-\|f_1 - f_2\|_2^1}$$

$f_1$ and $f_2$ are convolution features of the corresponding object boxes. During the calculation of measurement likelihood of particles and objects, the convolution features corresponding to the particles are calculated by using the object feature map set corresponding to the objects and the background feature map set:

$$S_i = S_i^o - S_i^b = (F_i^o - F_i^b) \otimes I_l, i = 1, \ldots, d.$$

$I_l$ is a normalized image of a candidate box represented by the particles. $S_i$ is unfolded according to rows to obtain d one-dimensional vectors which are sequentially connected into a feature $f_l$ of the candidate box corresponding to the final particles.

Step V: Updating and Extraction of Object State 5.1 Updating of Object State

It is assumed that a multi-object prediction probability distribution of the (k−1)th frame is:

$$\pi_{k|k-1} = \{(r_{k|k-1}^{(i)}, p_{k|k-1}^{(i)})\}_{i=1}^{M_{k|k-1}}, M_{k|k-1} = M_{k-1} + M_{\Gamma,k}$$

The posterior probability distribution of multiple objects is updated through the measurement likelihood of the particles:

$$\pi_k = \left\{ \left( r_k^{(i)}, p_k^{(i)} \right) \right\}_{i=1}^{M_k}$$

The updated multiple Bernoulli parameter set is obtained according to the following formula:

$$r_k^{(i)} = \frac{r_{k|k-1}^{(i)} \varepsilon_k^{(i)}}{1 - r_{k|k-1}^{(i)} + r_{k|k-1}^{(i)} \varepsilon_k^{(i)}}$$

$$w_k^{(i,j)} = \frac{1}{\varepsilon_k^{(i)}} w_{k|k-1}^{(i,j)} g_{T_k^i}\left( f_{s_{k|k-1}^{(i,j)}}^{(i,j)} \right)$$

$$p_k^{(i^i)} = \frac{1}{\varepsilon_k^{(i^i)}} \sum_{j=1}^{L_{k|k-1}^{(i^i)}} w_{k|k-1}^{(i^i,j)} g_{T_k^{i^i}}\left(f_{s_{k|k-1}^{(i^i,j)}}\right)^{\delta_{(i^i,j)}(s)}_{s_{k|k-1}^{(i^i,j)}}$$

$$f_{s_{k|k-1}^{(i^i,j)}}$$

is a convolution feature of a particle $$s_{k|k-1}^{(i^i,j)}, \varepsilon_k^{(i^i)} = \sum_{j=1}^{L_{k|k-1}^{(i^i)}} w_{k|k-1}^{(i^i,j)} g_{T_k^{i^i}}\left(f_{s_{k|k-1}^{(i^i,j)}}\right), g_{T_k^{i^i}}\left(f_{s_{k|k-1}^{(i^i,j)}}\right)$$

is the measurement likelihood between a convolution feature $T_k^{i^i}$ of a template corresponding to the object $l^i$ and the feature of the particle $s_{k|k-1}^{(i^i,j)}$, which is consistent with the calculation process of the elements of the similarity matrix.

5.2 Extraction of Object State

In order to prevent the particles from being degraded, the disclosure uses a random resampling method to resample a sampling particle set, so as to avoid the degradation of the particles and cut Bernoulli components with extremely small existence probabilities. The object states corresponding to Bernoulli components with the existence probability greater than 0.5 are extracted.

Step VI: Object Occlusion Processing Mechanism

When the intersection over union IOU of two adjacent object boxes is greater than the threshold value $T_u$, it can be determined that the two objects are adjacent to each other and partially occlude each other. At this time, the detector may have three cases: 1) when the objects are not completely occluded, the detector may detect the two objects, and in the method of the disclosure, an updating mechanism is used to perform tracking and template updating on the objects; 2) when only one object can be detected by the detector, it can be determined that the other object is an occluded object, and template updating for the occluded object is stopped; and a displacement difference of two previous frames of the object is used to estimate a real-time speed v and a motion direction θ of the object so as to predict and estimate the object, and the size of the object box is kept unchanged; and (3) when the two objects cannot be detected by the detector, an occluded object is determined according to the similarity of the object and the template, and the occluded object is processed by using the same way in the situation (2). if the object disappears or is lost in the tracking process, the object is re-recognized according to the detection result and matching of object templates when the object is separated or reappears.

Step VII: Updating of Object Template

In a motion process of an object, a surrounding environment and the own state may change constantly, such as background change, distortion, rotation and scale change, so that the object templates need to be updated in real time. It is overall considered to use a track of a survival object, the object templates and an object detection result to fuse and update the object templates, i.e.:

$$f_k^{i^i} = \begin{cases} (1-\rho)f_{k-1}^{i^i} + \rho \hat{f}_{k-1}^{i^i}(1-\tilde{\eta}) + \tilde{\eta}\tilde{f}_f^{i^i}, & \tilde{C}_k^{i^i} > T_B \\ (1-\rho)f_{k-1}^{i^i} + \rho \hat{f}_{k-1}^{i^i}, & \text{others} \end{cases}$$

$f_k^{i^i}$ and $f_{k-1}^{i^i}$ respectively represent convolution feature templates corresponding to the objects $l^i$ in the kth and (k−1)th frames of video sequences; $\hat{f}_{k-1}^{i^i}$ is the sparse representation of the convolution feature of a tracking result of the object $l^i$ in the (k−1)th frame of video sequence; $\tilde{f}_k^{i^i}$ is the sparse representation of the convolution feature of a detection box of the object $l^i$ in the kth frame of video sequence; $\rho$ is a learning rate of a template; $\tilde{C}_k^{i^i}$ is a confidence score of the detection box corresponding to the object $l^i$ in the kth frame of video sequence; $\tilde{\eta}$ is a learning rate of the detection box. A relatively good detection box is used to update the object templates, which may effectively eliminate an accumulation error in the tracking process. Meanwhile, in the motion process, the states of the objects may change constantly. A detection box with high accuracy is used to update the templates, which may effectively add the latest states of the objects into the templates to better adapt to the subsequent tracking of the objects.

In order to verify the effect of the visual multi-object tracking based on multi-Bernoulli filter with YOLOv3 detection, which is provided by the disclosure, experiments are as follows.

1. Experimental Conditions and Parameters

The video sequence data used in the disclosure are the sequence Huamn4 in the Visual Tracker Benchmark TB50, the sequences Jogging, Subway, and Suv in the Visual Tracker Benchmark TB100, and the sequence EnterExitCrossingPaths1cor in a CAVUAR dataset. These five groups of typical video sequences are derived from different scenarios respectively, and include interference situations such as dynamic background, object proximity, object deformation, picture blurring, object size change and object occlusion. Evaluation indicators used in the experiments are Multiple Object Tracking Accuracy (MOTA), Multiple Object Tracking Precision (MOTP), Mostly Tracked (MT), and Identity Switches (IDs), which are defined as follows:

1) Multiple Object Tracking Accuracy (MOTA)

$$MOTA = 1 - \frac{\sum_t m_t + fp_t + mme_t}{\sum_t g_t}$$

$m_t$ is the number of lost objects in a tth frame, $fp_t$ is the number of mis-detected objects in the tth frame, $mme_t$ is the number of objects with switched identities in a tracking track in the tth frame, and $g_t$ represents the actual number of objects in the tth frame.

2) Multiple Object Tracking Precision (MOTP)

$$MOTP = 1 - \frac{\sum_{i,t} d_t^i}{\sum_t c_t}$$

$d_t^i$ is an overlapping rate of a tracking box of an ith object in the tth frame and a real box of the object.

3) Mostly Tracked (MT) represents the number of object tracks in the object tracking tracks, which accounts for 80% or above of the length of a real track, so that the integrity of the track is portrayed.

4) (Identity Switch) IDs represents the number of switched identities of the objects in the tracking process.

2. Experiment and Result Analysis

The method of the disclosure is implemented using Matlab2016a, and runs on a workstation with an Intel Core i7-8700 processor, 3.2 GHz, 12 cores, a 16 GB memory and an NVIDIA Geforce GTX 1080 Ti display card, and performance comparison and analysis are performed on the method and a traditional particle filter multiple Bernoulli (PFMB) method as well as an IOU-Tracker method proposed in the paper *High-Speed Tracking-by-Detection Without Using Image Informations* published by Erik Bochinski, et al in 2017. Since the traditional PFMB method lacks a newborn object detection mechanism, YOLOv3 is also used for detection in this experiment, and a detection result determined as a newborn object is used as a newborn object of the PFMB, and then tracked.

Specific experiments evaluate the performance of the inventive method from four aspects, i.e.: object re-recognition, object proximity and occlusion, image blurring and object deformation, large displacement of object, etc. Experimental results are as follows.

Experiment I: Object Re-Recognition

The video sequence used in this experiment is the EnterExitCrossingPaths1cor sequence in the CAVUAR dataset. This sequence includes 383 frames of images. There are the problems of object proximity and long-term object occlusion, and the deformation is relatively large with the gradual appearance of the objects. Due to the long-term occlusion, it is very easy to lose the objects. By fusion of a result of the detector, the tracks of the survival objects and the object templates, the disclosure can realize the re-recognition of the objects, and re-add the objects into the tracking track.

Figure 4:
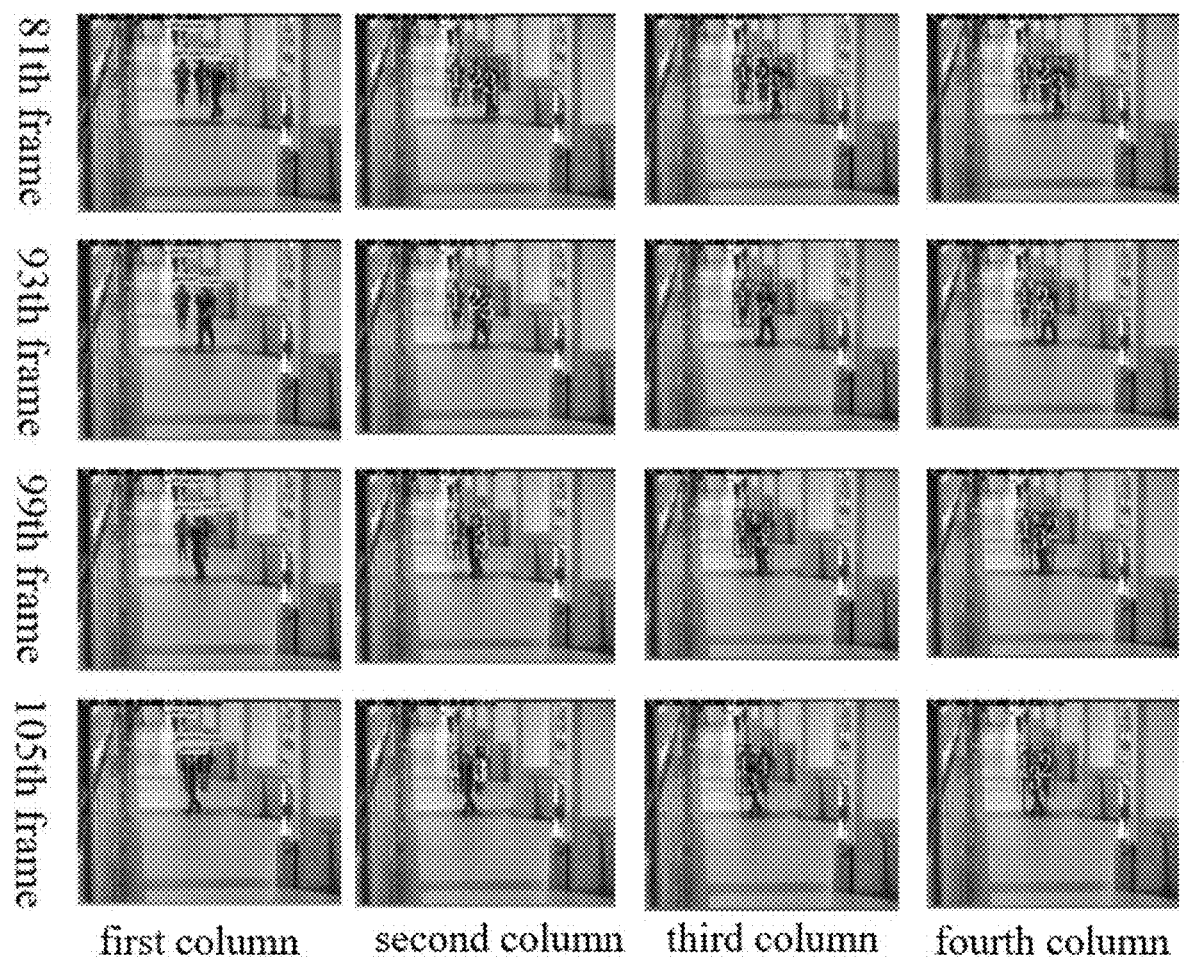
FIG. 4 is an experimental result of a EnterExitCrossingPaths1cor sequence.

FIG. 4 shows the experimental results of the EnterExitCrossingPaths1cor sequence. The first column in FIG. 4 shows a detection result of the YOLOv3 algorithm, The second column in FIG. 4 shows a tracking result of the traditional PFMB method, The third column in FIG. 4 is a tracking result of the IOU-Tracker method, and the fourth column in FIG. 4 is a tracking result of the method of the disclosure. It can be seen that when an object is occluded, the detector may not be able to detect the occluded object, which greatly reduces the detection effect. As shown in the 93th frame in the first column in FIG. 4, the traditional PFMB method is used. When there is occlusion, the object is lost. Since the IOU-Tracker does not use image information at all, and only uses the detection result of the object for tracking processing, this method may not continue to track lost objects. When the object is detected again, it will be defined as a newborn object, which is difficult to be associated with a historical object. In the method of the disclosure, for an object that has been occluded for a long time, since the object disappears due to the gradual decrease in the existence probability, when the object reappears, it can be effectively re-identified and re-added into the object tracking track.

Figure 5:
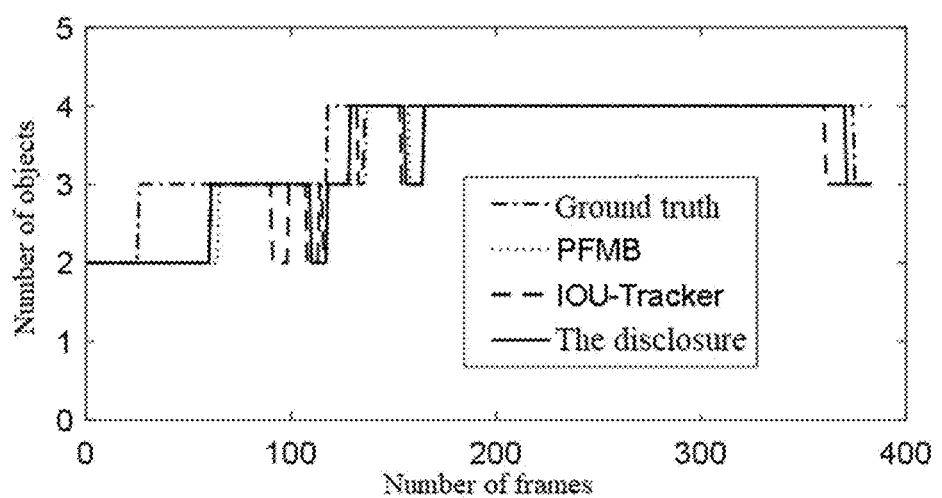
FIG. 5 is a comparison diagram of estimation of the number of objects of the EnterExitCrossingPaths1cor sequence experiment.
Figure 6:
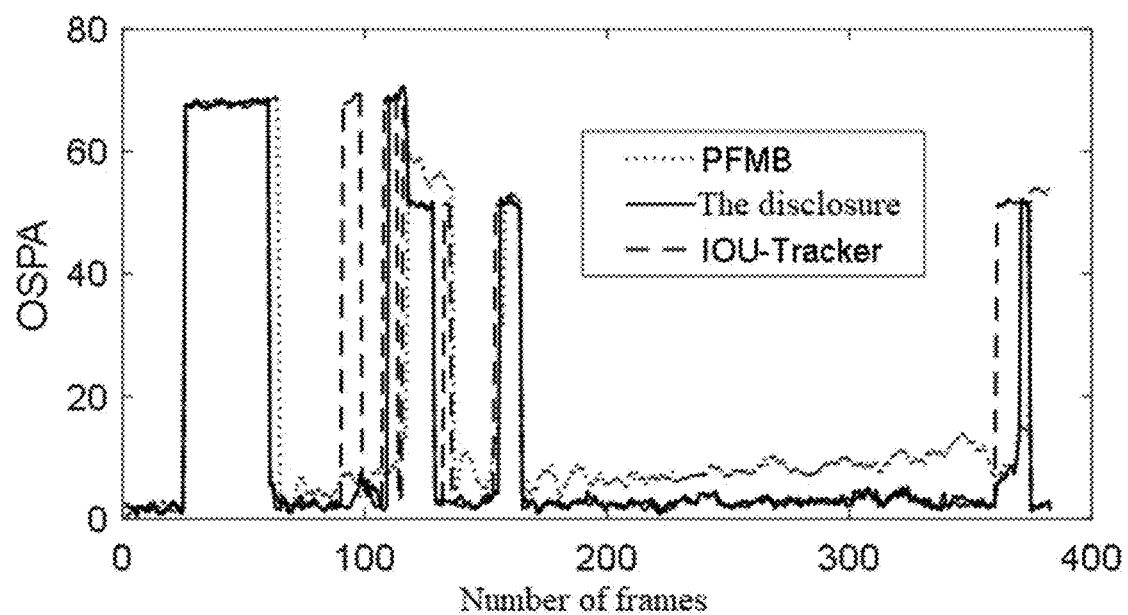
FIG. 6 is a comparison diagram of estimation of an OSPA distance of the EnterExitCrossingPaths1cor sequence experiment.

FIG. 5 is a comparison diagram of estimation of the number of objects of the EnterExitCrossingPaths1cor sequence experiment, and FIG. 6 is a comparison diagram of estimation of an OSPA distance of the EnterExitCrossingPaths1cor sequence experiment. It can be seen that the traditional PFMB method lacks an object occlusion processing mechanism.

After the object is occluded, it is prone to cause false tracking and lost tracking, which causes a tracking box to deviate greatly and an OSPA value to rise. The IOU-Tracker method is affected by the performance of the detector. In the process that the object is occluded, the number of objects decreases, and the OSPA value rises sharply. When the method of the disclosure processes the object that is occluded for a long time, the object may also be lost. When the object is out of occlusion, the lost object may be effectively re-recognized, and the overall tracking performance is better than the traditional PFMB method and IOU-Tracker method. In particular, it can be seen from the four evaluation indicators: MOTA, MOTP, MT and IDs shown in Table 1.

Table 1 shows results of 50 Monte Carlo simulations. It can be seen that the traditional PFMB method has the lowest values of MOTA, MOTP and MT, and the value of IDs is 1, because the method lacks the object re-recognition process, which leads to that after the object is lost, and when the object reappears, it cannot be associated with the previous track, thereby causing the identity switch. In the IOU-Tracker method, when the object is adjacent or occluded, the identity of the object will be frequently switched, resulting in the highest IDs. The method of the disclosure may effectively re-recognize the object, reduce the problem of identity switch of the object, and effectively reduce track fragments.

TABLE 1

Object re-recognition and tracking performance evaluation ( ↑ in the table represents the larger the better, and ↓ represents the smaller the better)

| | MOTA(↑) | MOTP(↑) | MT(↑) | IDs(↓) |
|---|---|---|---|---|
| PFMB | 76.8 | 73.1 | 3 | 1 |
| IOU-Tracker | 91.3 | 87.5 | 4 | 3 |
| Method of the disclosure | 92.7 | 87.7 | 4 | 0 |

Experiment II: Object Proximity and Occlusion

The video sequences use the Jogging sequence and the Subway sequence in the Visual Tracker Benchmark TB100 dataset. The Jogging sequence is an intersection scene where a camera moves, includes 3 moving objects, and there is a situation of object occlusion. The Subway sequence includes 8 objects, and there are problems that multiple objects are adjacent and frequently occluded.

Figure 7:
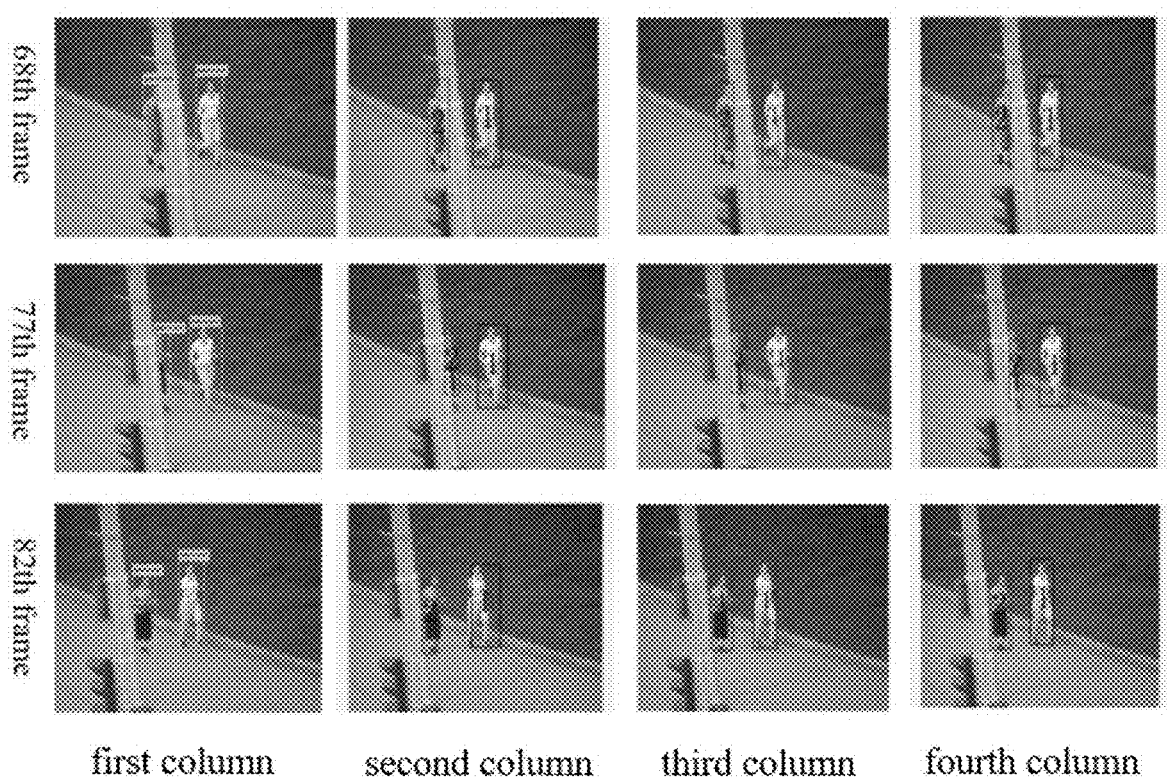
FIG. 7 is an experimental result of a Jogging sequence.

The experimental results of the Jogging sequence are shown in FIG. 7. The first column in FIG. 7 shows a detection result of the YOLOv3 algorithm, The first column in FIG. 4 shows a tracking result of the traditional PFMB method, The third column in FIG. 7 shows a tracking result of the IOU-Tracker method, and the fourth column in FIG. 7 shows a tracking result of the method of the disclosure. It can be seen that the YOLOv3 detector may hardly detect the occluded object correctly. The IOU-Tracker method loses the lost object. When the object is out of the occluded state, the IOU-Tracker method will define a re-detected object as a newborn object. In the traditional PFMB method, even if no object is lost, the degree of deviation of the tracking box increases. The method of the disclosure may well fuse the detection result and the tracking result of the object to realize adjustment of the tracking box, and may obtain a more accurate tracking result.

Figure 8:
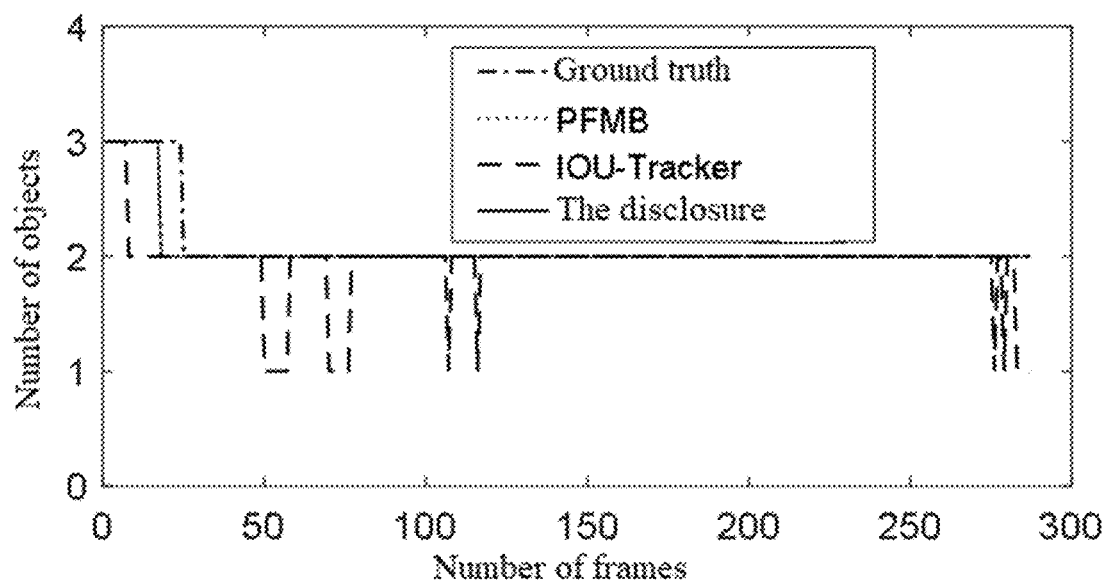
FIG. 8 is a comparison diagram of estimation of the number of objects of the Jogging sequence experiment.
Figure 9:
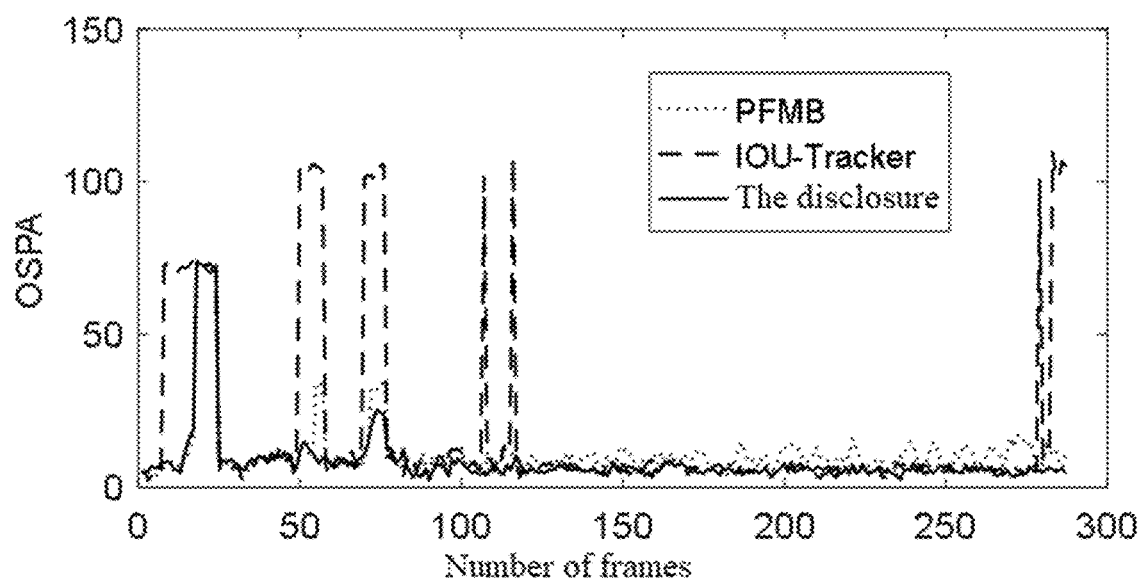
FIG. 9 is a comparison diagram of estimation of an OSPA distance of the Jogging sequence experiment.

FIG. 8 is a comparison diagram of estimation of the number change of objects of the Jogging sequence experiment. The traditional PFMB method is consistent with the method of the disclosure in the number change of objects. FIG. 9 is a comparison diagram of estimation of an OSPA distance of the Jogging sequence experiment. It can be seen that the YOLOv3 detector has a missed detection case, which leads to inaccurate estimation of the number of objects in the IOU-Tracker method and causes decrease in missed estimation, relatively large sharp rise of an OSPA value and low accuracy. In the traditional PFMB method, after the object is occluded, the degree of deviation of the tracking box increases, leading to increased rise of the OSPA value. The method of the disclosure has better anti-occlusion capacity, and the tracking performance is obviously higher than that of the traditional PFMB method and that of the IOU-Tracker method.

Figure 10:
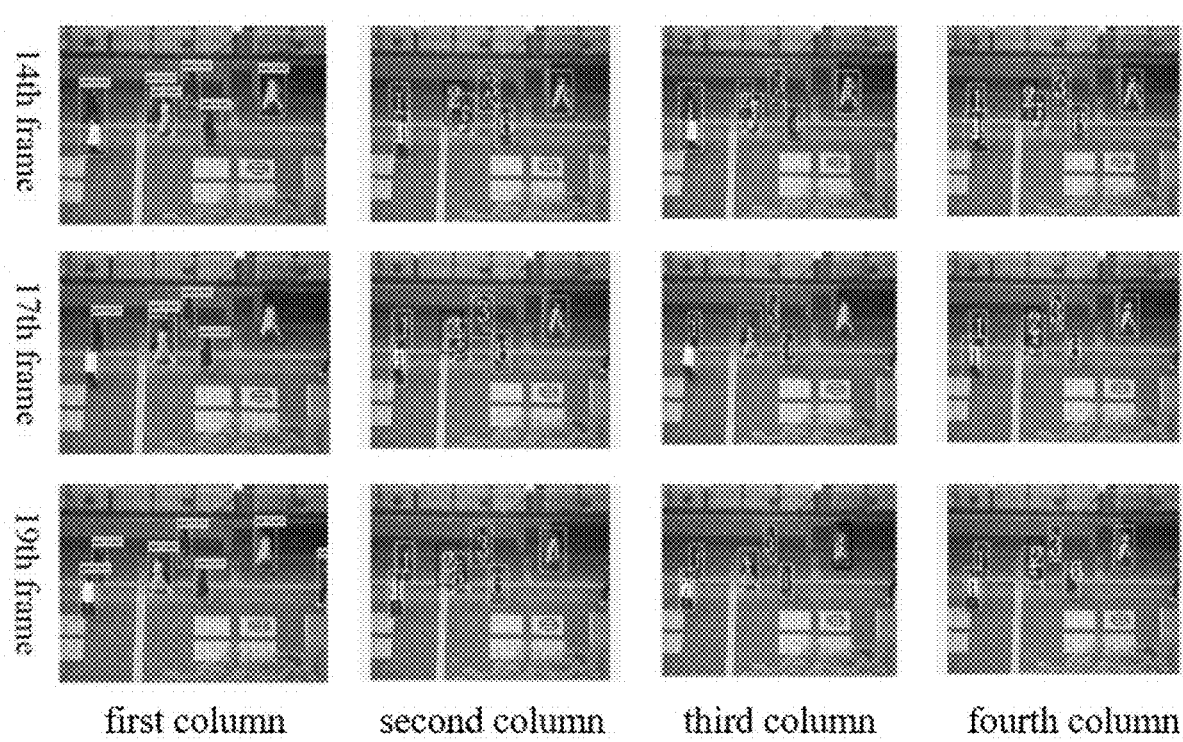
FIG. 10 is an experimental result of a Subway sequence.

The experimental results of the Subway sequence are shown in FIG. 10. The first column in FIG. 10 shows a detection result of the YOLO v3 algorithm, The second column in FIG. 10 shows a tracking result of the traditional PFMB method, The third column in FIG. 10 shows a tracking result of the IOU-Tracker method, and the fourth column in FIG. 10 shows a tracking result of the method of the disclosure. It can be seen that when multiple objects are adjacent or occlude each other, it is difficult for the detector to detect the occluded object or get a detection result with a relatively large deviation, which causes the IOU-Tracker method to frequently lose the objects. When the traditional PFMB method deals with the occlusion and proximity problems, relatively large deviations may also occur, and even the objects are lost, as shown in the 17th and 19th frames in the second column in FIG. 10, and the method of the disclosure may better track the occluded objects.

Figure 11:
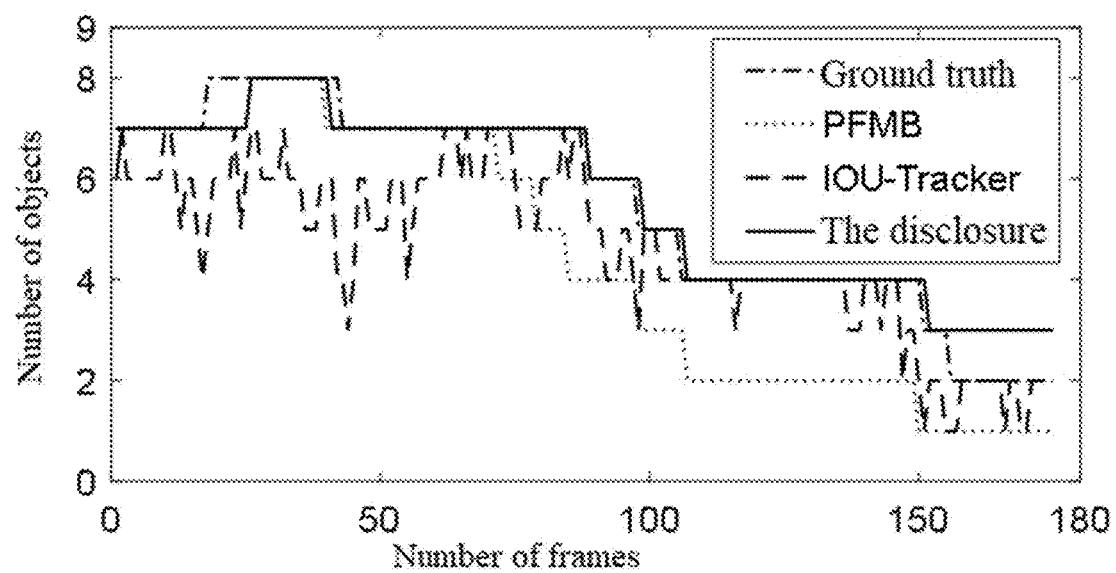
FIG. 11 is a comparison diagram of estimation of the number of objects of the Subway sequence experiment.
Figure 12:
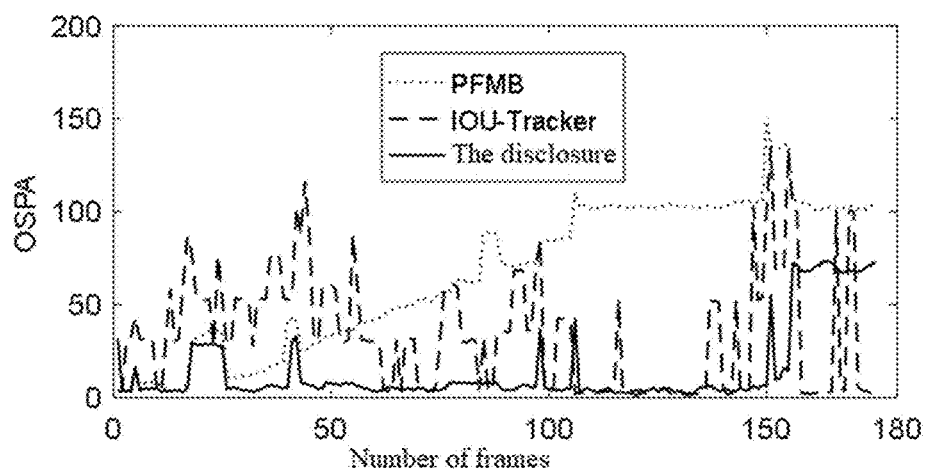
FIG. 12 is a comparison diagram of estimation of an OSPA distance of the Subway sequence experiment.

FIG. 11 shows a comparison diagram of estimation of the number of objects of the Subway sequence, and FIG. 12 shows a comparison diagram of estimation of an OSPA distance of the Subway sequence. It can be seen that since the YOLOv3 detector may hardly detect partially appearing and occluded objects, the number of objects in the IOU-Tracker method changes greatly and the OSPA value is high. The traditional PFMB method loses objects in the tracking process, and the OSPA value increases suddenly. The method of the disclosure may better deal with the problem of object occlusion and has relatively high tracking accuracy.

After 50 Monte Carlo simulations are performed, quantitative statistical results of tracking of the Jogging sequence are shown in Table 2.1. It can be seen that although the MOTA of the traditional PFMB method is equivalent to that of the method of the disclosure, after the occlusion is restored, the tracking box of the traditional PFMB method will deviate, resulting in a relatively large tracking error, so the MOTP value is less than that of the method of the disclosure. In addition, due to the poor detection effect of the occluded object by the detector, and two objects in the sequence are always in close proximity, the IOU-Tracker method has relatively low tracking accuracy on the proximate sequence Jogging, and the identities of the objects are switched frequently.

Quantitative analysis results of the Subway sequence are shown in Table 2.2. In this sequence, multiple objects are also in the state of being occluded and proximate to each other for a long time. The method of the disclosure is significantly superior to the traditional PFMB method and the IOU-Tracker method on MOTA, MOTP, MT and IDs.

TABLE 2.1

Object proximity and occlusion of the Jogging sequence

|  | MOTA(↑) | MOTP(↑) | MT(↑) | IDs(↓) |
|---|---|---|---|---|
| PFMB | 91.5 | 72.5 | 2 | 0 |
| IOU-Tracker | 80.4 | 72.2 | 2 | 10 |
| Method of the disclosure | 92.7 | 76.1 | 2 | 0 |

TABLE 2.2

Object proximity and occlusion of the Subway sequence

|  | MOTA(↑) | MOTP(↑) | MT(↑) | IDs(↓) |
|---|---|---|---|---|
| PFMB | 53.6 | 73.2 | 6 | 2 |
| IOU-Tracker | 77.4 | 80.4 | 4 | 49 |
| Method of the disclosure | 87.2 | 82.1 | 8 | 0 |

Experiment III: Image Blurring and Object Deformation

The video sequence uses the Human4 sequence in the Visual Tracker Benchmark TB50 dataset. The sequence includes a total of 667 frames of images which show a traffic light intersection scenario where a camera moves, including three types of 17 objects. In the video, object blurring is caused by camera movement or fast object movement, and many objects frequently deform.

Figure 13:
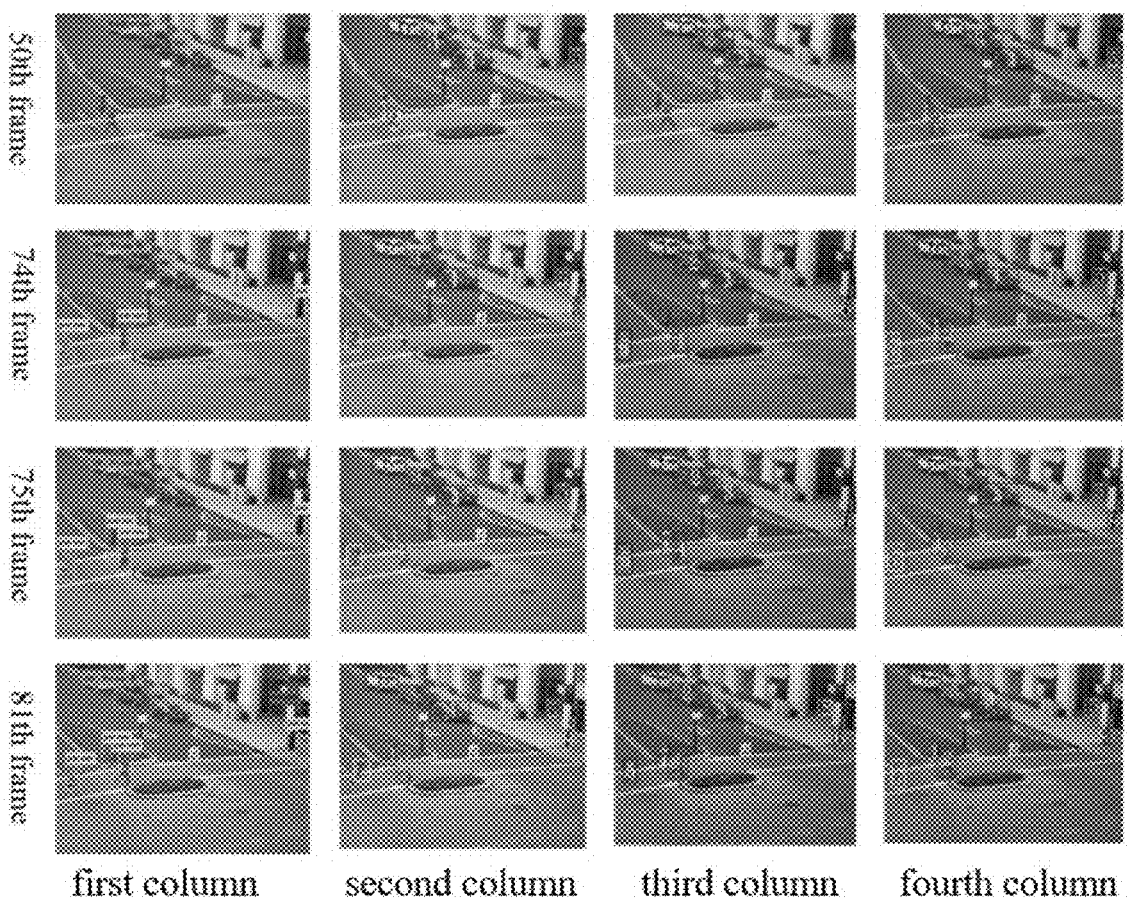
FIG. 13 is an experimental result of a Human4 sequence.

FIG. 13 shows an experimental result of the Human4 sequence. The first column in FIG. 13 shows a detection result of the YOLOv3 algorithm, The second column in FIG. 13 shows a tracking result of the traditional PFMB method, The third column in FIG. 13 shows a tracking result of the IOU-Tracker method, and the fourth column in FIG. 13 shows a tracking result of the method of the disclosure. It can be seen that the image blurring may cause the performance of the detector to decrease, and some objects are not detected, as shown in 50th and 74th frames in the first column in FIG. 13. The object deformation has a small impact on the performance of the detector. Although the traditional PFMB method can keep up with the objects, the tracking boxes of some objects will deviate, and the method of the disclosure may better deal with the two cases and has relatively high tracking accuracy.

Figure 14:
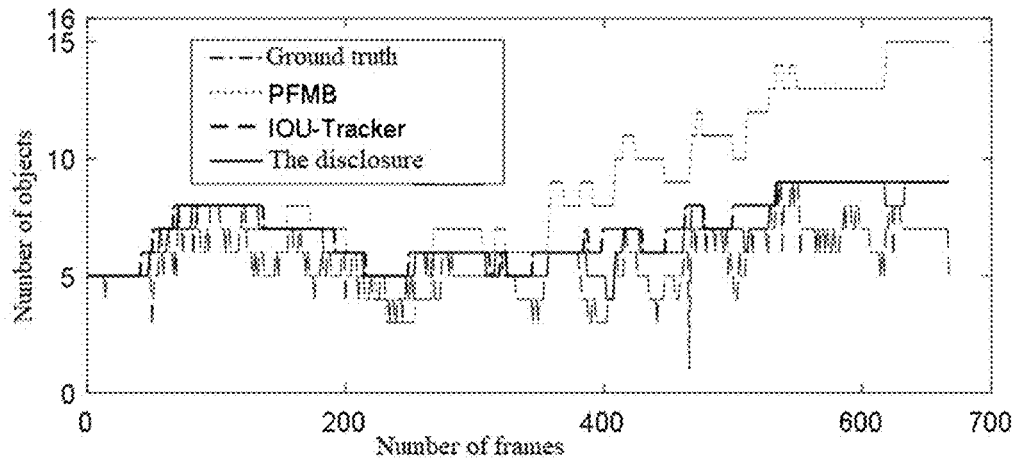
FIG. 14 is a comparison diagram of estimation of the number of objects of the Human4 sequence experiment.
Figure 15:
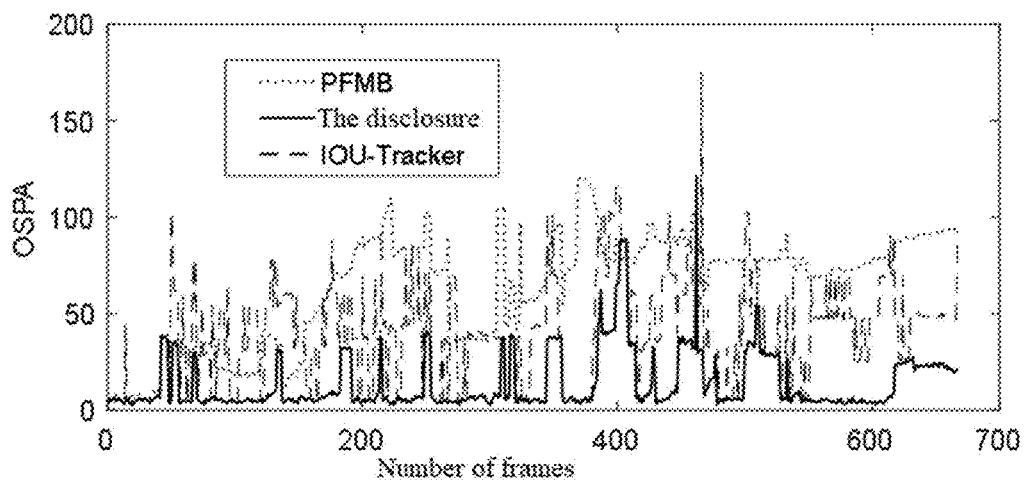
FIG. 15 is a comparison diagram of estimation of an OSPA distance of the Human4 sequence experiment.

FIG. 14 shows a comparison diagram of estimation of the number of objects of the Human4 sequence, and FIG. 15 shows a comparison diagram of estimation of an OSPA distance of the Human4 sequence. It can be seen that the method of the disclosure may better deal with the problems of image blurring and object deformation, and has the tracking performance superior to that of the traditional PFMB method and that of the IOU-Tracker method.

50 Monte Carlo simulations are performed, and quantitative analysis results are shown in Table 3. It can be seen that due to frequent object deformation and image blurring, the traditional PFMB method fails to track the objects or only tracks partial regions of the objects, resulting in lower values of MOTA, MOTP and MT, and the IOU-Tracker method may better use the detection result of the detector, so the MOTP value is equivalent to that of the method of the disclosure, while the size change of the object and the image blurring cause the performance of the detector to be reduced. Some objects are missed, which makes the MOTA value small and the IDs value largest. That is, the identities of a large number of objects are switched, and the track estimation is inaccurate. The method of the disclosure may better associate the detection boxes and effectively reduce the switching of the identities of the objects, and is obviously superior to the IOU-Tracker method in the IDs.

TABLE 3

Tracking performance evaluation of object blurring and deformation

| | MOTA(↑) | MOTP(↑) | MT(↑) | IDs(↓) |
|---|---|---|---|---|
| PFMB | 53.5 | 73.1 | 8 | 24 |
| IOU-Tracker | 77.3 | 78.7 | 9 | 118 |
| Method of the disclosure | 85.1 | 80.1 | 13 | 17 |

Experiment IV: Large Displacement of Object

In this experiment, the video sequence uses the Suv sequence in the Visual Tracker Benchmark TB100 dataset. The sequence includes a total of 400 frames of images which show a highway scenario of a dynamic background of camera movement. It includes 6 objects, and there is a situation of large displacement caused by rapid movement.

Figure 16:
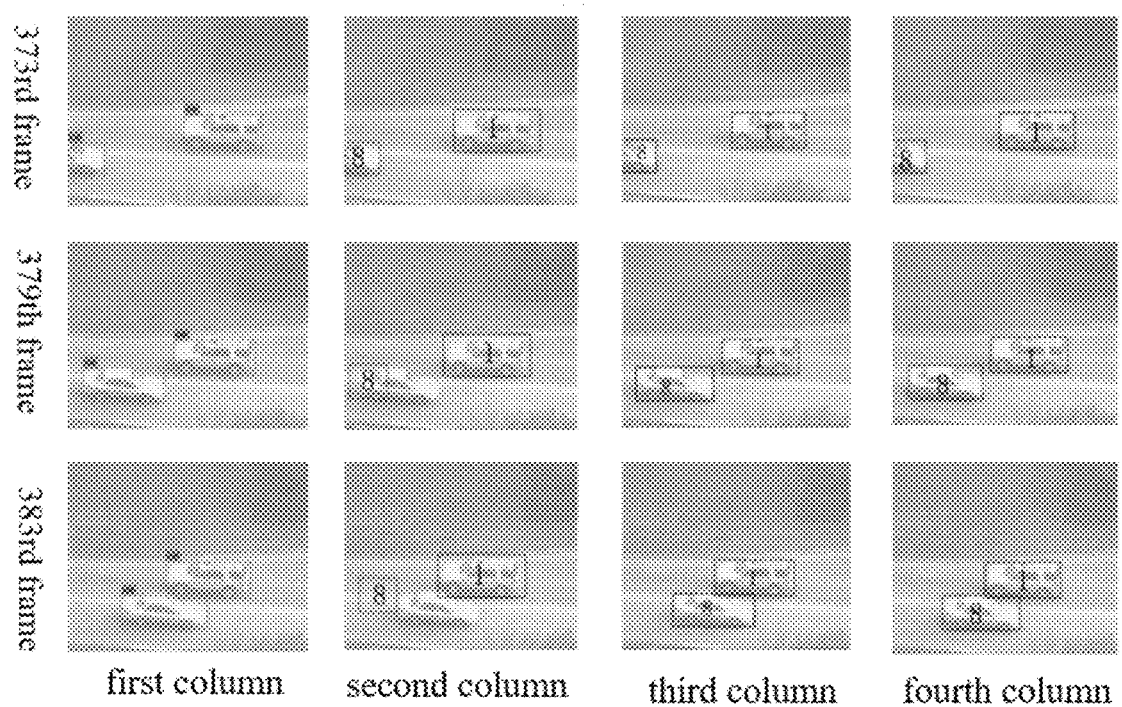
FIG. 16 is an experimental result of a Suv sequence.

FIG. 16 shows an experimental result of the Suv sequence. The first column in FIG. 16 shows a detection result of the YOLO v3 algorithm, The second column in FIG. 16 shows a tracking result of the traditional PFMB method, The third column in FIG. 16 shows a tracking result of the IOU-Tracker method, and the fourth column in FIG. 16 shows a tracking result of the method of the disclosure. It can be seen that the large displacement of an object has no impact on the detector, and the IOU-Tracker method performs well, but the traditional PFMB method may lose the object. The method of the disclosure uses the result of the detector to adjust the tracking process. The object tracking result for the large displacement is also significantly superior to those of the other two methods.

Figure 17:
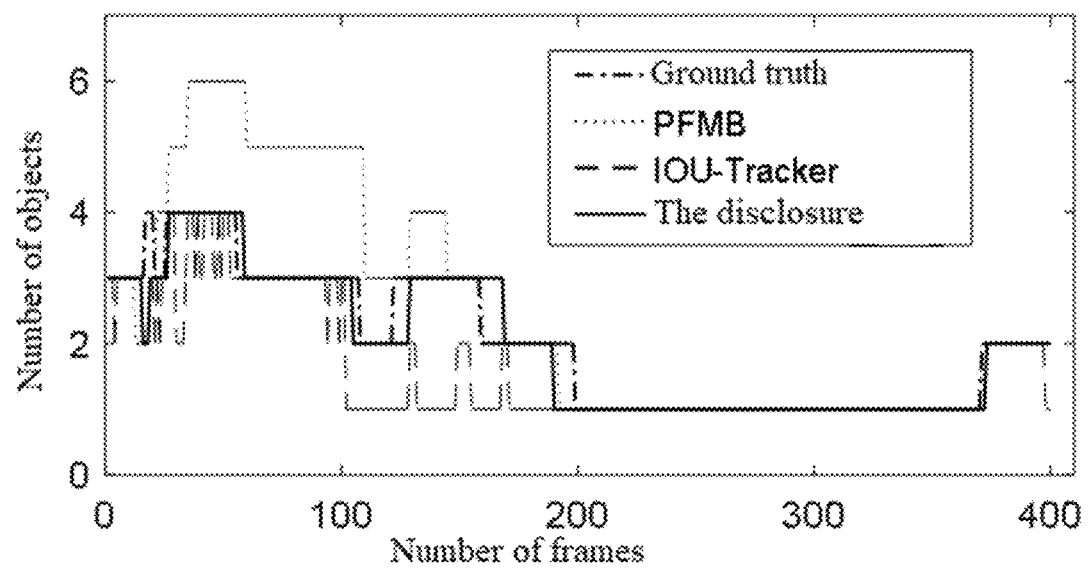
FIG. 17 is a comparison diagram of estimation of the number of objects of the Suv sequence experiment.
Figure 18:
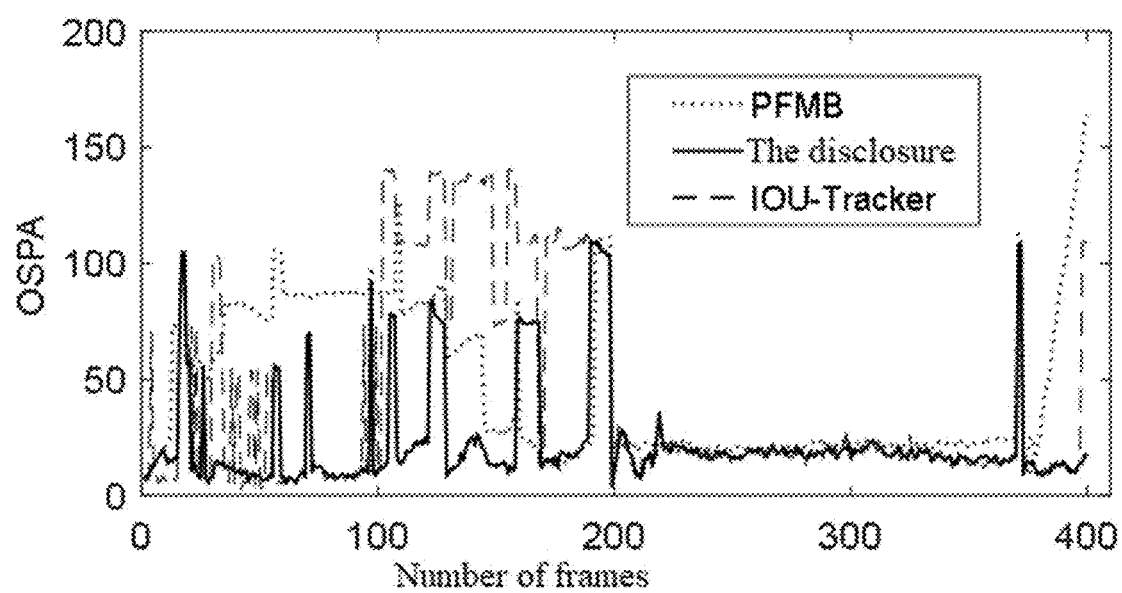
FIG. 18 is a comparison diagram of estimation of an OSPA distance of the Suv sequence experiment.

FIG. 17 shows a comparison diagram of estimation of the number of objects of the Suv sequence, and FIG. 18 shows a comparison diagram of estimation of an OSPA distance of the Suv sequence. It can be seen that the traditional PFMB method lacks a processing mechanism for the large displacement of the object, so when moving greatly, the object may be lost or the tracking box may deviate greatly, resulting in a relatively large OSPA value. The IOU-Tracker method and the method of the disclosure may improve the processing capacity of the large displacement of the object by using the result of the detector, and have relatively high tracking accuracy.

50 Monte Carlo simulations are performed, and quantitative analysis results are shown in Table 4. For tracking of large-displacement objects, the traditional PFMB method easily causes missed tracking and excessive position deviations. Therefore, the results of the four evaluation indicators are relatively poor. Since the video sequence also has object occlusion and proximity, it also leads to frequency identity switch of the objects in the tracking result of the IOU-Tracker method, so that the MOTA value is relatively low and the IDs value is relatively high. The method of the disclosure may effectively deal with the large displacement of the object by fusing the detection results, is obviously superior to the traditional PFMB method in various indicators, and is also significantly superior to the IOU-Tracker method in MOTA, MT and IDs.

TABLE 4

Tracking performance evaluation of large displacement of object

| | MOTA(↑) | MOTP(↑) | MT(↑) | IDs(↓) |
|---|---|---|---|---|
| PFMB | 37.7 | 66.2 | 1 | 4 |
| IOU-Tracker | 75.9 | 75.2 | 3 | 18 |
| Method of the disclosure | 85.7 | 74.9 | 5 | 1 |

It can be known from the above experiments that according to the video multi-object detection and tracking method based on the YOLOv3 multiple Bernoulli, by interactively fusing the detection results with the tracking results, in the object re-recognition process, for the objects that have been occluded for a long time, when they reappears, the objects can be effectively re-recognized; when there are multiple objects in close proximity and frequently occluded, the method provided by the disclosure can fuse the detection results with the tracking results of the objects to adjust the tracking boxes and obtain a relatively accurate tracking result; when there are image blurring and object deformation, the method provided by the disclosure can better associate the detection boxes to effectively reduce the IDs of the objects; and when there is the large displacement of the objects, the method provided by the disclosure can use the result of the detector to adjust the tracking process, thereby preventing occurrence of object loss.

Some steps in the examples of the disclosure may be implemented by software, and corresponding software programs may be stored in a readable storage medium, such as an optical disc or a hard disk.

What is claimed is:

1. A multi-object detection and tracking method, comprising:
    detecting kth and (k+1)th frames of video sequences by using a YOLOv3 technology;
    recording the number of detection boxes in the kth frame of video sequence as n, and
    recording a detection box state set as $\tilde{S}_k = \{\tilde{s}_k^{l_k^i}\}_{i=1}^{n}$;
    recording the number of detection boxes in the (k+1)th frame of video sequence as m, and
    recording a detection box state set as $\tilde{S}_{k+1} = \{\tilde{s}_{k+1}^{l_{k+1}^i}\}_{i=1}^{m}$;
    wherein $\tilde{s}_k^{l_k^i} = [\tilde{x}_k^{l_k^i}, \tilde{y}_k^{l_k^i}, \tilde{w}_k^{l_k^i}, \tilde{h}_k^{l_k^i}, \tilde{I}_k^i]$ represents a state vector of an ith detection box in the kth frame of video sequence, and parameters $\tilde{x}_k^{l_k^i}, \tilde{y}_k^{l_k^i}, \tilde{w}_k^{l_k^i}, \tilde{h}_k^{l_k^i}$, and $\tilde{I}_k^i$ represent an x coordinate and a y coordinate of an upper left corner of the ith detection box in the kth frame of video sequence, and a width, a height and an identity of the detection box, respectively; and
    matching the detection boxes in the kth and (k+1)th frames of video sequences:
    for an initial frame of a video, k=0, adding the matched detection boxes in the initial frame into an object template set and an object track set as initial newborn objects; and
    for a middle frame of the video, k>0, realizing newborn object determination, missed object re-recognition and optimal tracking of survival objects by using the detection box, object track information and object template information, wherein the optimal tracking of survival objects is that a tracking process of a corresponding object is optimized under a multiple Bernoulli filtering architecture by using information of the detection box with the confidence score greater than a set confidence score threshold value $T_B$ in a current frame.

2. The method according to claim 1, wherein for the initial frame of the video, k=0, the adding the matched detection boxes in the initial frame into the object template set and the object track set as the initial newborn objects comprises:
  representing the detection boxes in the kth and (k+1)th frames of video sequences by using anti-interference convolution features, and recording the detection boxes as $\tilde{F}_k=\{\tilde{f}_k^1, \tilde{f}_k^2, \ldots \tilde{f}_k^n\}$ and $\tilde{F}_{k+1}=\{\tilde{f}_{k+1}^1, \tilde{f}_{k+1}^2, \ldots \tilde{f}_{k+1}^m\}$, respectively, wherein $\tilde{f}_k^i$ represents a convolution feature vector of the ith detection box in the kth frame of video sequence;
  calculating a similarity matrix $\Lambda$ corresponding to convolution features of the detection box, i.e.:

$$\Lambda = \begin{bmatrix} e_{11} & \cdots & e_{1m} \\ e_{21} & \cdots & e_{2m} \\ \vdots & \ddots & \vdots \\ e_{n1} & \cdots & e_{nm} \end{bmatrix}$$

wherein $e_{ij}=e^{-\|\tilde{f}_k^i-\tilde{f}_{k+1}^j\|_2}$ represents similarity between the ith detection box in the kth frame of video sequence and a jth detection box in the (k+1)th frame of video sequence; and
  selecting two detection boxes with maximum similarity values and greater than a similarity threshold value $T_l$ from each row of the similarity matrix $\Lambda$ as matching results, and adding a finally matched detection box pair into the object template set and the object track set as the initial newborn objects.

3. The method according to claim 2, wherein matching the detection boxes in the two initial frame of video sequences, determining newborn objects, and adding the finally matched detection box pair into the object template set as the initial newborn objects comprises:
  if a same object does not have an extremely large displacement change in two adjacent frames of video sequences, on the basis of similarity matching, adding an intersection over union IOU of an object box as a limit: if the intersection over union IOU of the two detection boxes is greater than an intersection over union threshold value $T_u$, determining that the two detection boxes are matched; and
  selecting two detection boxes with maximum similarity values and greater than the similarity threshold value $T_l$ and the intersection over union IOU greater than the intersection over union threshold value $T_u$ from each row of the similarity matrix $\Lambda$ as a matched result, allocating an identity $\{l^i\}_{i=1}^{M_k}$ to the finally matched detection box pair as the initial newborn object, adding the matched detection box pair into the object track set $S_k=\{s_k^{j^i}\}_{i=1}^{M_k}$, wherein $s_k^{j^i}=[x_k^{j^i},y_k^{j^i},w_k^{j^i},h_k^{j^i},l^i]$ is an object state vector, various components represent the x coordinate and the y coordinate of the upper left corner of the ith object box and the width, the height and the identity of the object box, respectively, and $M_k$ is the number of objects in the kth frame, adding an object identity, i.e., $\tilde{l}_k^i=l^i$, and $\tilde{l}_{k+1}^j=l^i$, corresponding to the initial newborn object to the matched detection box pair, and building a newborn object template at the same time.

4. The method according to claim 3, wherein for the middle frame of the video, k>0, the realizing the newborn object determination, the missed object re-recognition and the optimal tracking of survival objects by using the detection box, the object track information and the object template information comprises:
  matching adjacent detection boxes, determining determination conditions of newborn objects and re-recognized objects, and determining whether an object is a newborn object, a re-recognized object or a survival object according to the detection boxes of adjacent frames, the object template set and a survival object track set.

5. The method according to claim 4, wherein the matching the adjacent detection boxes comprises:
  calculating a similarity matrix $\Lambda$ between the detection boxes in the kth and (k+1)th frames of video sequences, selecting two detection boxes with maximum similarity values and greater than the similarity threshold value $T_l$ from each row of the similarity matrix $\Lambda$, determining that the two detection boxes are matched if the intersection over union IOU of the two detection boxes is greater than the intersection over union threshold value $T_u$, and assigning the identity of the matched object in the (k+1)th frame if the ith detection box in the kth frame is matched with the jth detection box in the (k+1)th frame, i.e.:

$$\tilde{l}_{k+1}^j=\tilde{l}_k^i$$

wherein $\tilde{l}_k^i$ represents an identity of the ith detection box in the kth frame of video sequence, and if $\tilde{l}_k^i$ is empty, it indicates that an object comprised in the detection box is not detected in a (k−1)th frame of video sequence.

6. The method according to claim 5, wherein the determining whether an object is a newborn object, a re-recognized object or a survival object according to the detection boxes of adjacent frames, the object template set and the survival object track set comprises:
  (1) newborn object recognition
  if $\tilde{l}_k^i$ is empty, matched with the jth detection box in the (k+1)th frame of video sequence and matched with no object in the object template set, determining that the object is a newborn object, allocating an identity $\{l^i\}_{i=n+1}^{M_\Gamma+n}$, and building a newborn object state set:

$$S_\Gamma=\{s_\Gamma^{j^i}\}_{i=n+1}^{M_\Gamma+n}$$

wherein $s_\Gamma^{j^i}=[x_\Gamma^{j^i},y_\Gamma^{j^i},w_\Gamma^{j^i},h_\Gamma^{j^i},l^i]$ represents a state vector of a newborn object with the identity $l^i$, $M_\Gamma$ represents the number of newborn objects, and n represents the number of object templates; adding an object identity corresponding to the newborn object to the matched detection box pair, i.e., $\tilde{l}_k^i=l^i$, and $\tilde{l}_{k+1}^j=\tilde{l}_k^i$, adding the newborn object into the object template set, and initializing sampling particles of the newborn object;
  (2) missing object re-recognition
  if $l_k^i$ is empty, matched with the jth detection box in the (k+1)th frame of video sequence and matched with no object in the survival object track set, but is matched with an object with the identity $l^a$ in the object template set, indicating that the object comprised in the detection box is not detected in the previous frame of video sequence, and is missed; in the kth frame of video sequence, re-recognizing the object, and re-adding the object into the survival object track set:

$$S_k=\{s_k^{j^i}\}_{i=1}^{M_k}\cup s_k^{l^a}$$

wherein $s_k^{j^i}=[x_k^{j^i},y_k^{j^i},w_k^{j^i},h_k^{j^i},l^i]$ represents a state vector of the survival object with the identity $l^i$; and adding an object identity correspondingly the same as the re-recognized object to the matched detection box pair, i.e., $\tilde{l}_k^i=l^a$, and $\tilde{l}_{k+1}^j=\tilde{l}_k^i$;

(3) survival object recognition if $l_k^i$ is not empty, determining that the detection box object is a survival object, the identity of the object being $\tilde{l}_k^i$; if $\tilde{l}_k^i$ is empty, but is matched with an object with the identity $l^b$ in the survival object track set, also determining that the detection box object is the survival object, and performing identity assignment on the survival object, i.e., $\tilde{l}_k^i = l^b$; and (4) clutter recognition if $\tilde{l}_k^i$ is empty, matched with no detection box in the (k+1)th frame of video sequence and matched with no object in the object template set, determining that the detection box is an interference clutter.

7. The method according to claim 6, further comprising: building an object motion model according to the confidence score of the detection box;

if the object motion model is a random walk model, and when a YOLOv3 detector detects the object and the confidence score $\tilde{C}_k^{l^i}$ of the detection box is greater than a confidence score threshold value $T_B$, adjusting a state of the object by using the detection box, i.e., $$s_k^{l^i} = \begin{cases} \eta \tilde{s}_k^{l^i} + (1-\eta) s_{k-1}^{l^i} + e(k-1), & \tilde{C}_k^{l^i} > T_B \\ s_{k-1}^{l^i} + e(k-1), & \text{others} \end{cases}$$

wherein $s_{k-1}^{l^i}$ is a state vector of the object with the identity $l^i$ in the (k−1)th frame of video sequence; $\tilde{s}_k^{l^i}$ is a detection box of the object with the identity $l^i$ in the kth frame of video sequence; the confidence score $\tilde{C}_k^{l^i}$ of the detection box represents the probability that the detection box comprises the object and a score of the matching degree of the detection box and the object; e(k−1) represents zero-mean Gaussian white noise; η is a learning rate between the state of the object and corresponding detection box information; and if the confidence score of the detection box is higher, η is greater, indicating that a detection result is more trustworthy.

8. The method according to claim 7, wherein in the (k−1)th frame of video sequence, a multiple Bernoulli parameter set $\pi_{k-1} = \{(r_{k-1}^{(l^i)}, p_{k-1}^{(l^i)})\}_{i=1}^{M_{k-1}}$ is used to represent a posterior probability distribution of multiple objects, wherein $M_{k-1}$ is the number of objects existing in the (k−1)th frame of video sequence, $r_{k-1}^{(l^i)}$ represents the existence probability of the object $l^i$ in the (k−1)th frame of video sequence, and $p_{k-1}^{(l^i)}$ represents a probability distribution of the object $l^i$ in the (k−1)th frame of video sequence, represented by a group of weighted particles:

$$p_{k-1}^{(l^i)}(s) = \sum_{j=1}^{L_{k-1}^{(l^i)}} \omega_{k-1}^{(l^i,j)} \delta_{s_{k-1}^{(l^i,j)}}(s)$$

wherein $\omega_{k-1}^{(l^i,j)}$ represents a weight of a jth sampling particle of the object $l^i$ in the (k−1)th frame of video sequence, $s_{k-1}^{(l^i,j)}$ represents a state vector of the jth sampling particle of the object $l^i$ in the (k−1)th frame of video sequence, $L_{k-1}^{(l^i)}$ is the number of sampling particles of the object $l^i$, and δ(•) is a Dirac delta function;

the multi-object probability distribution is still a multiple Bernoulli parameter set, represented as:

$$\pi_{k|k-1} = \{(r_{P,k|k-1}^{(l^i)}, p_{P,k|k-1}^{(l^i)})\}_{i=1}^{M_{k-1}} \cup \{(r_{\Gamma,k}^{(l^i)}, p_{\Gamma,k}^{(l^i)})\}_{j=n+1}^{M_{\Gamma,k}+n}$$

a multiple Bernoulli parameter prediction $\{(r_{P,k|k-1}^{(l^i)}, p_{P,k|k-1}^{(l^i)})\}_{i=1}^{M_{k-1}}$ of the survival object can be obtained by the following formula:

$$r_{P,k|k-1}^{(l^i)} = r_{k-1}^{(l^i)} \sum_{j=1}^{L_{k-1}^{(l^i)}} \omega_{k-1}^{(l^i,j)} p_{S,k}\left(s_{k-1}^{(l^i,j)}\right)$$

$$p_{P,k|k-1}^{(l^i)}(s) = \sum_{j=1}^{L_{k-1}^{(l^i)}} \tilde{\omega}_{P,k|k-1}^{(l^i,j)} \delta_{s_{P,k|k-1}^{(l^i,j)}}(s)$$

wherein $$s_{P,k|k-1}^{(l^i,j)} \sim f_{k|k-1}\left(\cdot \mid s_{k-1}^{(l^i,j)}\right)$$

$$\tilde{\omega}_{P,k|k-1}^{(l^i,j)} = \frac{\omega_{P,k|k-1}^{(l^i,j)}}{\sum_{j=1}^{L_{k-1}^{(l^i)}} \omega_{P,k|k-1}^{(l^i,j)}}$$

$$\omega_{P,k|k-1}^{(l^i,j)} = \omega_{k-1}^{(l^i,j)}$$

$f_{k|k-1}(\bullet | s_{k-1}^{(l^i,j)})$ is a state transfer function, obtained by calculation by using a random walk model through the following formula:

$$f_{k|k-1}\left(\cdot \mid s_{k-1}^{(l^i,j)}\right) = N\left(\cdot; \mu_{k-1}^{l^i}, e(k-1)\right)$$

wherein $$\mu_{k-1}^{l^i} = \begin{cases} \eta \tilde{s}_k^{l^i} + (1-\eta) s_{k-1}^{l^i}, & \tilde{C}_k^{l^i} > T_B \\ s_{k-1}^{l^i}, & \text{others} \end{cases}$$

$$e(k-1) = \sum_{j=1}^{L_{k-1}^{(l^i)}} \omega_{k|k-1}^{(l^i,j)} \left(\mu_{k-1}^{l^i} - s_{k-1}^{(l^i,j)}\right)\left(\mu_{k-1}^{l^i} - s_{k-1}^{(l^i,j)}\right)^H$$

the multiple Bernoulli parameter set $\{(r_{\Gamma,k}^{(l^i)}, p_{\Gamma,k}^{(l^i)})\}_{j=n+1}^{M_{\Gamma,k}+n}$ of the newborn object can be obtained by calculation through the following formula:

$$r_{\Gamma,k}^{(l^j)} = \tilde{C}_k^{l^j}$$

$$p_{\Gamma,k}^{(l^j)}(s_\Gamma) = \sum_{i=1}^{L_{k-1}^{(l^j)}} \omega_{k-1}^{(l^j,i)} \delta_{s_{\Gamma,k-1}^{(l^j,i)}}(s_\Gamma)$$

wherein $M_{\Gamma,k}$ is the number of newborn objects in the kth frame of video sequence.

9. The method according to claim 8, wherein if the multi-object prediction probability distribution in the (k−1)th frame of video sequence is:

$$\pi_{k|k-1} = \{(r_{k|k-1}^{(l^i)}, p_{k|k-1}^{(l^i)})\}_{i=1}^{M_{k|k-1}}, M_{k|k-1} = M_{k-1} + M_{\Gamma,k}$$

the posterior probability distribution of the multiple objects is updated through measurement likelihood of the particles:

$$\pi_k = \{(r_k^{(i^i)}, p_k^{(i^i)})\}_{i=1}^{M_k}$$

an updated multiple Bernoulli parameter set is obtained according to the following formula:

$$r_k^{(i^i)} = \frac{r_{k|k-1}^{(i^i)} \varepsilon_k^{(i^i)}}{1 - r_{k|k-1}^{(i^i)} + r_{k|k-1}^{(i^i)} \varepsilon_k^{(i^i)}}$$

$$w_k^{(i^i,j)} = \frac{1}{\varepsilon_k^{(i^i)}} w_{k|k-1}^{(i^i,j)} g_{T_k^{i^i}}\left(f_{s_{k|k-1}^{(i^i,j)}}\right)$$

$$p_k^{(i^i)} = \frac{1}{\varepsilon_k^{(i^i)}} \sum_{j=1}^{L_{k|k-1}^{(i^i)}} w_{k|k-1}^{(i^i,j)} g_{T_k^{i^i}}\left(f_{s_{k|k-1}^{(i^i,j)}}\right) \delta_{s_{k|k-1}^{(i^i,j)}}(s)$$

wherein $$f_{s_{k|k-1}^{(i^i,j)}}$$

is a convolution feature of the particle $$s_{k|k-1}^{(i^i,j)}, \varepsilon_k^{(i^i)} = \sum_{j=1}^{L_{k|k-1}^{(i^i)}} w_{k|k-1}^{(i^i,j)} g_{T_k^{i^i}}\left(f_{s_{k|k-1}^{(i^i,j)}}\right), g_{T_k^{i^i}}\left(f_{s_{k|k-1}^{(i^i,j)}}\right)$$

is measurement likelihood between the convolution feature $T_k^{i^i}$ of the template corresponding to the object $l^i$ and the feature of the particle $s_{k|k-1}^{(i^i,j)}$; and the calculation process is consistent with the calculation process of elements of the similarity matrix.

10. The method according to claim 9, wherein in a motion process of the object, an object template is updated by fusing a track of the survival object, the object template and an object detection result, i.e.:

$$f_k^{i^i} = \begin{cases} (1-\rho)f_{k-1}^{i^i} + \rho \hat{f}_{k-1}^{i^i}(1-\tilde{\eta}) + \tilde{\eta}\hat{f}_k^{i^i}, & \tilde{C}_k^{i^i} > T_B \\ (1-\rho)f_{k-1}^{i^i} + \rho \hat{f}_{k-1}^{i^i}, & \text{others} \end{cases}$$

wherein $f_k^{i^i}$ and $f_{k-1}^{i^i}$ represent convolution feature templates corresponding to the objects $l^i$ in the kth and (k−1)th frames of video sequences, respectively, $\hat{f}_{k-1}^{i^i}$ is a sparse representation of convolution features of a tracking result of the object $l^i$ in the (k−1)th frame of video sequence, $\tilde{f}_k^{i^i}$ is a sparse representation of convolution features of the detection box of the object $l^i$ in the kth frame of video sequence, ρ is a learning rate of a template, $\tilde{C}_k^{i^i}$ is a confidence score of the corresponding detection box of the object $l^i$ in the kth frame of video sequence, and $\tilde{\eta}$ is a learning rate of the detection box.

11. The method according to claim 10, further comprising: when the intersection over union IOU of two adjacent object boxes is greater than the threshold value $T_u$, determining that the two objects are occluded;

(1) when the detector can detect the two objects, indicating that the objects are slightly occluded, and performing adaptive updating on the object template;

(2) when only one object can be detected by the detector, determining that the other object is an occluded object, and stopping template updating for the occluded object; and using a displacement difference of two previous frames of the object to estimate a real-time speed v and a motion direction θ of the object so as to predict the object, and keeping the size of the object box unchanged; and (3) when the two objects cannot be detected by the detector, determining an occluded object according to the similarity of the object box and the template, and treating the occluded object by using the same way in the situation (2); if the object disappears or is lost in the tracking process, re-recognizing the object according to the detection result and matching of the object templates when the object is separated or reappears.

* * * * *